US010985999B2

(12) United States Patent
Warfield et al.

(10) Patent No.: US 10,985,999 B2
(45) Date of Patent: Apr. 20, 2021

(54) METHODS, DEVICES AND SYSTEMS FOR COORDINATING NETWORK-BASED COMMUNICATION IN DISTRIBUTED SERVER SYSTEMS WITH SDN SWITCHING

(71) Applicant: OPEN INVENTION NETWORK LLC, Durham, NC (US)

(72) Inventors: Andrew Warfield, Vancouver (CA); Geoffrey Lefebvre, Montreal (CA); Brendan Anthony Cully, Vancouver (CA); Daniel Stodden, Vancouver (CA)

(73) Assignee: OPEN INVENTION NETWORK LLC, Durham, NC (US)

( * ) Notice: Subject to any disclaimer, the term of this patent is extended or adjusted under 35 U.S.C. 154(b) by 1258 days.

(21) Appl. No.: 14/514,690

(22) Filed: Oct. 15, 2014

(65) Prior Publication Data

US 2015/0106420 A1 Apr. 16, 2015

Related U.S. Application Data

(60) Provisional application No. 61/891,176, filed on Oct. 15, 2013.

(51) Int. Cl.
*G06F 15/16* (2006.01)
*H04L 12/24* (2006.01)

(52) U.S. Cl.
CPC ...... *H04L 41/5077* (2013.01); *H04L 41/5041* (2013.01)

(58) Field of Classification Search
CPC .......................... H04L 41/5077; H04L 41/5041
USPC .......................................................... 709/201
See application file for complete search history.

(56) References Cited

U.S. PATENT DOCUMENTS

| 6,912,588 | B1 * | 6/2005 | Jardin | ..................... H04L 29/06 709/238 |
| 8,028,186 | B2 * | 9/2011 | Bennett | ............... G06F 13/4243 327/149 |
| 8,090,973 | B2 | 1/2012 | Bennett | |
| 8,127,018 | B2 * | 2/2012 | Frutiger | ................ G06F 9/5083 709/225 |
| 8,285,961 | B2 * | 10/2012 | Sikdar | ..................... G06F 3/061 711/114 |
| 8,346,810 | B2 * | 1/2013 | Beaverson | ........ G06F 17/30094 707/791 |

(Continued)

*Primary Examiner* — Ryan J Jakovac

(57) ABSTRACT

Systems, methods and devices relating to coordinated network communication (e.g. transport-layer communication) of client requests and client request responses between a client and a distributed network service system, the network service nodes of the distributed network service system comprising a storage resource, a network interface, and a computer processor module for sending a coordinated network communication of data request responses to the client upon receipt of (1) network communication of client requests from clients; or (2) communication data channel information from another network service node. There is also provided a network switching device for managing a coordinated network communication of data transactions between clients and a distributed network service system comprising a plurality of network service nodes, the network switching device configured to manage higher-layer data units to coordinate a network communication of data transactions between clients and a distributed network service system.

21 Claims, 10 Drawing Sheets

(56) References Cited

U.S. PATENT DOCUMENTS

| | | | |
|---|---|---|---|
| 8,463,825 B1 * | 6/2013 | Harty | G06F 17/30233 |
| | | | 707/813 |
| 8,782,238 B2 * | 7/2014 | Witt | G06F 17/30 |
| | | | 709/208 |
| 8,806,262 B2 | 8/2014 | Bennett | |
| 2003/0149773 A1 * | 8/2003 | Harbin | H04L 67/10 |
| | | | 709/227 |
| 2009/0271495 A1 * | 10/2009 | Allen | H04L 67/2814 |
| | | | 709/217 |
| 2012/0331029 A1 * | 12/2012 | King, III | G06F 17/30206 |
| | | | 709/201 |
| 2013/0019057 A1 * | 1/2013 | Stephens | G06F 11/108 |
| | | | 711/103 |
| 2013/0019062 A1 * | 1/2013 | Bennett | G06F 3/0614 |
| | | | 711/114 |
| 2013/0024615 A1 * | 1/2013 | Cordella | G06F 3/061 |
| | | | 711/114 |

* cited by examiner

```
+---------+---------+---------+---------+
|              Source Address           |
+---------+---------+---------+---------+
|            Destination Address        |
+---------+---------+---------+---------+
|  zero   |  PTCL   |     TCP Length    |
+---------+---------+---------+---------+
```

910

METHODS, DEVICES AND SYSTEMS FOR COORDINATING NETWORK-BASED COMMUNICATION IN DISTRIBUTED SERVER SYSTEMS WITH SDN SWITCHING

FIELD OF THE DISCLOSURE

The present invention relates to network communications, and, in particular, to methods, devices and systems for coordinating network-based communication in distributed server systems with software-defined networking (SDN) switching.

BACKGROUND

Among other drawbacks, enterprise storage targets are very expensive. They can often represent an estimated 40% of capital expenditures on a new virtualization deployment (the servers and software licenses combine to form another 25%), and are among the highest-margin components of capital expenditure in enterprise IT spending. Enterprise Storage Area Networks (SANs) and Network Attached Storage (NAS) devices, which are typically utilized as memory resources for distributed memory systems, are very expensive, representing probably the highest margin computer hardware available in a datacenter environment.

Some systems, such as Veritas™'s cluster volume manager (to name just one), attempt to mitigate this cost by consolidating multiple disks on a host and/or aggregate disks within a network to provide the appearance of a single storage target. While many such systems perform some degree of consolidating memory resources, they generally use simple, established techniques to unify a set of distributed memory resources into a single common pool. They provide little or no differentiation between dissimilar resource characteristics, and provide little or no application- or data-specific optimizations with regard to performance. Put simply, these related systems strive for the simple goal of aggregating distributed resources into the illusion of a single homogenous resource.

Managing the storage of data (documents, databases, email, and system images such as operating system and application files) is generally a complex and fragmented problem in business environments today. While a large number of products exist to manage data storage, they tend to take piecewise solutions at individual points across many layers of software and hardware systems. The solutions presented by enterprise storage systems, block devices or entire file system name spaces, are too coarse grained to allow the management of specific types of data across the most appropriate types of available storage resources (e.g. "All office documents should be stored on a reliable, high-performance, storage device irrespective of what computer they are accessed from"). It is difficult or impossible to specify other fine-grained (i.e. per-file, per-data object, per-user/client, e.g.) policies that utilize the priority, encryption, durability, or performance properties of data, and then associate these properties of specific data objects with the optimal storage resources available across a storage system that in one way or another aggregates multiple storage resources. This is for static data, but is certainly true for more real-world scenarios where data characteristics (e.g. priority or "hotness") or the storage resource characteristics (i.e. a storage node becomes inoperable) are continually in flux over time.

In existing enterprise or aggregated storage systems, network switches or other devices direct data requests (or responses thereto) between clients and distributed storage servers or other network nodes. In many cases the nodes are implemented to appear as a single logical unit to the client, or in some cases the nodes are presented as available virtual memory devices; in either such case, data requests and responses must presently be handled in accordance with existing communication and file server protocols. In conventional distributed memory systems, in order to maintain communication integrity of any higher than network layer data units, the requesting client establishes a point-to-point communication service with a destination node; in this case the requesting client is the computing device that sends a read, write or update request and the destination node is the physical node to which it sends the request (and where data that is associated with the data request/response is or will be stored). Typically, this point-to-point communication occurs in accordance with a transport protocol such as TCP or UDP, although other such protocols exist in the transport layer, but also other layers in the TCP/IP model or the OSI model. In distributed storage systems, however, in which data may be in any one of the available storage resources that are aggregated and presented as a single logical unit, there are significant limitations placed on the system because the communication service, such as TCP, which provides for communication between the requesting node and destination node, is not configured to permit responses to data requests from storage resources that are not the expected destination node, not to mention other problems such as out of order TCP segments or IP packets. Since data units will be associated with the destination node, if the data is returned from an alternative node, the data unit will not be accepted by either the requesting node, or in some cases the network infrastructure devices therebetween (e.g. routers, switches), unless the system is configured to have the destination node understand the current state of other nodes and then have a means for seeking out the requested data from the appropriate node. This problem becomes worse as distributed storage systems are scaled to be larger and as such current enterprise storage systems have historically faced significant challenge with scalability.

Some alternatives have been developed which enable the destination node to query all other nodes, obtain the data from the appropriate node, and then package and return it as if it had been stored on the expected destination node (that is the node with which a communication service is engaged in point-to-point communication). This, however, places a significant operational load on the distributed storage system. This problem will increase as data is moved around on the distributed data system, or the distributed data system is made more complex, scaled or made more distributed. In the last example, the farther the correct destination node is from the expected destination node, the more taxed the system will become when it is seeking and returning data from the correct destination node.

In some so-called "soft switches," there have been efforts to more finely control a data stream travelling over a network switching device by, for example, extracting some higher layer data unit information (e.g. the TCP header from within an IP packet or Ethernet frame). These require a processing load, however, for each data unit travelling over the network switch enroute to the expected destination that is incompatible with the requirements of today's data networks. It is for this reason that most modern switches, such as Ethernet switches, have been logically divided into a control plane and a forwarding plane (see for example "Forwarding and Control Element Separation (ForCES) Framework," RFC 3746, Network Working Group, April 2004, which is incorporated herein in its entirety by reference). These components, while inter-related, perform functions that are largely independent of each other. The forwarding plane is generally responsible for a router's capacity to process and forward packets, which may include functions such as packet forwarding (also referred to as packet switching), which is the act of receiving packets on the router's interfaces and usually sending them out on other interfaces, classification, traffic shaping, and metering. The control plane is generally responsible for controlling the router. The control plane implements functions such as routing protocols, signaling protocols, control protocols (e.g., RIP, OSPF, and RSVP), and network management and dictates the forwarding behavior by manipulating forwarding tables, per-flow QoS tables, and access control lists. For example, the control plane gathers and maintains network topology information and passes this information to the forwarding plane so that the forwarding plane knows where to forward received packets. Typically, the architecture of these two components combines all of the required functionality into a single functional whole with respect to external entities. The forwarding plane in many switches is specifically designed for high speed handling of data units, and can perform an extremely high number of forwarding operations. These are typically orders of magnitude higher than the processing capabilities of the control plane, which tends to rely on more general purpose processing techniques. As such, management of data requests, and in particular when management may require an understanding of information that is only available from data units in layers above those available to the network switch (e.g. information available in TCP segments within the payload of an IP packet or Ethernet frame being managed by a network switching device). A mechanism of handling such management at the forwarding plane is required in order to meet the requirements of today's data networks.

TCP termination methodologies, which generally include a TCP stack between a client and network device (that acts as an endpoint) and which is configured to generate additional TCP stacks between itself and storage nodes, fails, amongst other drawbacks, to provide for a scalable architecture for adding storage nodes, and suffers from limited functionality.

This background information is provided to reveal information believed by the applicant to be of possible relevance. No admission is necessarily intended, nor should be construed, that any of the preceding information constitutes prior art.

SUMMARY

The following presents a simplified summary of the general inventive concept(s) described herein to provide a basic understanding of some aspects of the invention. This summary is not an extensive overview of the invention. It is not intended to restrict key or critical elements of the invention or to delineate the scope of the invention beyond that which is explicitly or implicitly described by the following description and claims.

A need exists for methods, devices and systems for coordinating network-based communication in distributed server systems with software-defined networking (SDN) switching that overcome some of the drawbacks of known techniques, or at least, provide a useful alternative thereto. Some aspects of this disclosure provide examples of such methods, systems and devices.

In accordance with one aspect, there is provided a network service node for use in a distributed network service system comprising a plurality of network service nodes supporting distributed network communications with a client, the network service node comprising: a storage resource for use by at least one client-accessible service; a network interface to the network service system; and a processor configured to process a client request when related to said at least one client-accessible service upon both: receipt of said client request when directed to the node; and indirect receipt of said client request, when directed to another node of the distributed network service system, along with related communication channel state information required for the node to become stateful with the client in directly fulfilling said client request with the client.

In accordance with another aspect, there is provided a distributed network service system accessible by a client, comprising: a plurality of network service nodes, each given node comprising: a storage resource associated therewith for use by at least one client-accessible service; and a processor configured to process a given client request when related to said at least one client-accessible service using said storage resource upon both: receipt of said given client request when directed to said given node; and indirect receipt of said client request, when directed to another node of the distributed network service system, along with related communication channel state information required for said given node to become stateful with the client in directly fulfilling said client request with the client; and a network switching device interfacing between said plurality of network service nodes and the client to direct said given client request to said given node in fulfilling said given client request.

In accordance with another aspect, there is provided a network switching device for interfacing between a client and a plurality of network service nodes in a distributed network service system, wherein each of the network nodes comprises a storage resource associated therewith for use by at least one client-accessible service, and a processor configured to process a given client request when related to the at least one client-accessible service on the storage resource; the switching device comprising: a network interface to receive a given client request from the client and route said given client request to a selected one of network service nodes for processing; and a processor configured to route said given client request via said network interface to a destination node identified by said given client request upon determining that said client request is related to said at least one client-accessible service using said storage resource of said destination node; and otherwise determine that said given client request is related to said at least one client-accessible service using said storage resource of another node, and reroute said given client request to said other node along with related communication channel state information required for said other node to become stateful with the client in directly fulfilling said client request with the client.

In accordance with another aspect, there is provided a computer-readable medium having statements and instructions stored thereon for implementation by a processor to route a client request to a selected network service node in a distributed network service system in fulfilling the client request, wherein each of the network nodes comprises a storage resource associated therewith for use by at least one client-accessible service, and a processor configured to process a given client request when related to the at least one client-accessible service on the storage resource, the statements and instructions for: routing the client request to a destination node identified by the client request upon determining that the client request is related to the at least one client-accessible service using the storage resource of said destination node; and otherwise determining that the client request is related to the at least one client-accessible service using the storage resource of another node, and rerouting the client request to said other node along with related communication channel state information required for said other node to become stateful with the client in directly fulfilling the client request with the client.

In one embodiment, there is provided a storage node in a distributed storage system comprising a plurality of storage nodes, the storage node being configured for participation in a distributed network communication between a data client and the distributed storage system, the storage node comprising: at least one storage resource that is configured to store at least: a set of instructions and data related to data requests; a network interface for communicatively coupling, over one or more networks, the storage node to data clients and at least one other storage node in the distributed storage system; a computer processor module for carrying out the set of instructions that, when carried out, cause the storage node to send a data request response in the distributed network communication to the data client, when data related to the data request is associated with the at least one storage resource upon receipt of at least one of the following: the data request and communication data channel information from the distributed network communication; wherein said communication data channel information comprises information relating to one of the following group: the state of the distributed network communication and the data request.

In another embodiment, there is provided a network service node in a distributed network service system comprising a plurality of network service nodes, the network service node being configured for participation in a distributed network communication between a client and at least one of the plurality of network service nodes in the distributed network service, the node comprising: at least one storage resource configured to store at least: a set of instructions and data related to at least one client request; a network interface for communicatively coupling, over at least one network, the network service node to clients and at least one other network service node in the distributed network service system; and a computer processor module for carrying out the set of instructions that, when carried out, cause the network service node to process the client request from the distributed network communication, when data related to the client request is associated with the network service node, upon receipt by the network service node of at least one of the following: the client request and communication data channel information from the distributed network communication, wherein said communication data channel information comprises information relating to at least one of the following group: a state of the distributed network communication and the client request.

In another embodiment, there is provided a network switching device for managing a coordinated distributed network communication of data transactions between a data client and a distributed file system comprising a plurality of storage nodes, the network switching device comprising: at least one network interface for receiving and sending data units, the data units comprising encapsulated distributed network communication of data transactions; a storage resource; and a forwarding module, the forwarding module comprising a forwarding table comprising data unit identification information and respective data unit action information; and a forwarding module processor that (i) extracts data unit information, the data unit information comprising information associated with at least one of: the data transaction and the encapsulated distributed network communication of the data transaction, and (ii) compares data unit information with the forwarding table and actions the received data unit in accordance with the matching data unit forwarding information; a forwarding path module that compares each received data unit with the forwarding table and forwards the received data unit in accordance with the matching data unit forwarding information; and a control module configured to: amend the forwarding table based on the data unit information and storage resource information, the storage resource information comprising at least one of: a current location of data associated with a data unit, current operational characteristics of at least one of the storage resources, and a combination thereof; wherein the coordinated distributed network communication is distributed across at least two of the plurality of storage units.

In another embodiment, there is provided a method of coordinating a distributed network communication of data transactions between a data client and a plurality of storage nodes in a distributed storage system, the method comprising the following steps: (a) Receiving from a data client at the distributed storage system a distributed network communication of at least one data request; (b) For each data request, determining which storage node is associated with the data related to each data request; and (c) For each data request, forwarding communication data channel information relating to the distributed network communication of the data request to each storage node associated with data related to each data request, wherein communication data channel information comprises information relating to one of the following: the state of a distributed network communication, the data request, and a combination thereof; and (d) Using the communication data channel information to generate a coordinated distributed network communication of data response to the at least one data requests.

In another embodiments, there is provided a method of coordinating a distributed network communication of data transactions between a client and a plurality of network service nodes in a distributed network service system, the method comprising steps of: a) Receiving from a client at the distributed network service system a distributed network communication of at least one client request; b) For each client request, determining which network service node is associated with the data related to each client request; c) For each data request, forwarding communication data channel information relating to the distributed network communication of the client request to each network service node associated with data related to each client request, wherein communication data channel information comprises information relating to one of the following: the state of a distributed network communication, the client request, and a combination thereof; and d) Using the communication data channel information to generate a coordinated distributed network communication of client request responses responsive to the at least one client requests.

In another embodiment, there is provided a network switching device for managing a coordinated distributed network communication of data transactions between a client and a distributed network service system comprising a plurality of network service nodes, the network switching device comprising: at least one network interface for receiving and sending data units, the data units comprising encapsulated data transactions in the distributed network communication of a storage resource; a forwarding module having: a forwarding table comprising data unit identification information and respective data unit action information; and a forwarding module processor that (i) extracts data unit information, the data unit information comprising information associated with at least one of: the data transaction and the encapsulated distributed network communication of the data transaction, and (ii) compares data unit information with the forwarding table and actions the received data unit in accordance with the matching data unit forwarding information. The network switching device further comprising a forwarding path module that compares each received data unit with the forwarding table and forwards the received data unit in accordance with the matching data unit forwarding information; and a control module configured to amend the forwarding table based on at least one of the data unit information and network service node information, the network service node information comprising at least one of: a current location of data associated with a data unit, current operational characteristics of at least one of the network service nodes, and a combination thereof; wherein the coordinated distributed network communication is distributed to at least two of the plurality of network service nodes units.

In another embodiment, there is provided a distributed storage system for coordinating distributed network communication of data transactions between a data client and a plurality of storage nodes, the system comprising: a network switching device, being a network interface between the plurality of storage nodes and the data client, the network switching device configured to manipulate distributed network communication of data transactions to and from the plurality of storage nodes in a coordinated distributed network communication; the plurality of storage nodes, each of the storage nodes comprising at least one storage resource, a network interface controller that provides for communication with the network switching device and at least one other storage node in the plurality of storage nodes, and a processor, and each storage node being configured to send data request responses in the coordinated distributed network communication upon receipt of at least one of the following: a data request in the distributed network communication and communication data channel information, wherein communication data channel information comprises information relating to one of the following: the state of a distributed network communication, the data request, and a combination thereof.

In another embodiment, there is provided a distributed network service system for coordinating distributed network communication of data transactions between a client and a plurality of network service nodes, the system comprising: a network switching device, being a network interface between the plurality of network service nodes and the client, the network switching device configured to manipulate distributed network communication of data transactions to and from the plurality of network service nodes in a coordinated distributed network communication; the plurality of network service nodes, each of the storage nodes comprising at least one storage resource, a network interface controller that provides for communication with the network switching device and at least one other network service node in the plurality of network service nodes, and a processor, and each network service node being configured to send client request responses in the coordinated distributed network communication upon receipt of at least one of the following: a client request in the distributed network communication and communication data channel information, wherein communication data channel information comprises information relating to one of the following: the state of a distributed network communication, the client request, and a combination thereof.

In another embodiment, there is provided a network service node for use in a distributed network service system comprising a plurality of network service nodes supporting distributed network communications with a client, the network service node comprising: a storage resource for use by at least one client-accessible service; a network interface to the network service system; and a processor configured to process a client request when related to said at least one client-accessible service upon both: receipt of said client request when directed to the node; and indirect receipt of said client request, when directed to another node of the distributed network service system, along with related communication channel state information required for the node to become stateful with the client in directly fulfilling said client request with the client.

In another embodiment, there is provided a distributed network service system accessible by a client, comprising a plurality of network service nodes, each given node comprising: a storage resource associated therewith for use by at least one client-accessible service; and a processor configured to process a given client request when related to said at least one client-accessible service using said storage resource upon both (i) receipt of said given client request when directed to said given node and (ii) indirect receipt of said client request, when directed to another node of the distributed network service system, along with related communication channel state information required for said given node to become stateful with the client in directly fulfilling said client request with the client; and the distributed network service system further comprising a network switching device interfacing between said plurality of network service nodes and the client to direct said given client request to said given node in fulfilling said given client request.

In another embodiment, there is provided a network switching device for interfacing between a client and a plurality of network service nodes in a distributed network service system, wherein each of the network nodes comprises a storage resource associated therewith for use by at least one client-accessible service, and a processor configured to process a given client request when related to the at least one client-accessible service on the storage resource; the switching device comprising a network interface to receive a given client request from the client and route said given client request to a selected one of network service nodes for processing; and a processor configured to route said given client request via said network interface to a destination node identified by said given client request upon determining that said client request is related to said at least one client-accessible service using said storage resource of said destination node; and otherwise determine that said given client request is related to said at least one client-accessible service using said storage resource of another node, and reroute said given client request to said other node along with related communication channel state information required for said other node to become stateful with the client in directly fulfilling said client request with the client.

Some aspects of the instant disclosure may be characterized as devices and methods that leverage the use of software-defined networking (SDN) to scale and rebalance an NFS server. Scaling and rebalancing an NFS server may face challenges relating to having a single TCP connection to a single IP address, particularly when the single IP address overlays a plurality of distributed storage nodes. As data requirements increase, because for example there are a growing number of clients, growing amounts of data, or increasing requirements for specific types of storage resources to adequately handle the priority level of the data, the server that owns that address may become saturated, and so additional servers are required. In distributed storage systems, it may be desirable to appear to be a single logical storage unit, with traffic being spread out between the underlying physical storage nodes. In such cases, a network switch that connects clients to a distributed storage array can manage the processing of, for example, IP packets or Ethernet frames (or other protocol data units associated with a particular communications layer), and the TCP segments encapsulated therein (or other protocols and/or service data units and/or communications layers, i.e. not necessarily transport-layer and not necessarily TCP), by: (i) extracting information from the TCP segments and then forwarding the TCP segments accordingly; and (ii) in some cases amending the TCP segment information to maintain the appearance of continuity in a particular point-to-point communication between a client and a given destination node (even though an associated TCP segment in fact originated in a different order and/or from a different storage node than the destination node). This could also provide a number of related functionalities, including mapping between clients/flows and dynamically partitioning an address space/database/file/kv store across a plurality of storage nodes, (b) triangle routing, (c) other network communication coordination tasks that can be handled directly at the forwarding plane (e.g. TCAM or forwarding table resources) of a network switch.

In embodiments, some embodiments may use varying types of network switching devices: the switch may be a passive interface or it may be more active in coordinating the network communication to the distributed storage nodes. It may also have significant intelligence to make the distribution of the network communication more efficient and effective through reading, storing, analyzing, and amending data unit information.

In some aspects, there are a number of methodologies of coordinating a shared and distributed network communication. These include breaking and restarting a communication if the storage node is not associated with the data related to the next request, migrating the connection, or permitting data from a stateless storage node to be inserted or combined with the network communication of a stateful storage node. The switch may facilitate these options as well.

In some aspects, devices and methods are provided wherein point-to-point communication between clients and storage servers (i.e. destination node) is established and, among other things, ensures that data units sent over a network are associated with both the client and the destination node and are received and sent more or less in order. This, among other things, ensures the integrity of data communication and does so in a way that permits a file system or an application to leave the management of the communication over the network to the TCP layer. In embodiments of the instant application, data may be frequently moved from storage node to storage node and, as such, the data associated with a data request or a data unit (i.e. an IP packet) has been moved, updated elsewhere, or another node may just become more preferred based on its capabilities/current status/priority (including if a previous storage node has been fenced off). As such, the node associated with the data unit or the data request must be retrieved by the destination node, repackaged in a data unit as if it was originating from that destination node and then sent to the requesting client over the network. Aspects of the instant disclosure provide for a switch that is capable of recognizing that the data unit should in fact be associated with a different destination node and can, irrespective of the destination information currently associated with that data unit, forward the data unit to the desired destination node and/or receive the information directly from an alternative destination node where that data in fact resides at the time it was requested by a client. Embodiments can do this in a number of different ways: the data unit can be "re-coded" either at the destination node itself, or at the switch, to appear to the requesting client as though the data unit came from the expected destination node, or the switch can treat data units that have the "incorrect" destination node information as though they were correctly coded (in this example, the destination node information associated with the data unit is "incorrect" from the perspective of the client because it in fact comes from an alternative node and thus has information in the data unit that is not associated with the node from which the client requested the data). In some exemplary embodiments, whereas commercially available switches are not configured to extract and analyze information from higher layers than the network work layer, the instantly disclosed switch can extract TCP information from any given packet, recognize that the destination node associated with the data request in the TCP segment is no longer where that data resides. Alternatively, in some cases, the destination node is at that time not the most desirable node from which to access the data, as other copies, perhaps more up-to-date copies, exist elsewhere on available storage resources, which may be more appropriate to seek the data because, for example, they have operational characteristics that are more suited for the priority of the data that is being requested. This exemplary network switch can, for example, redirect the data packet accordingly, update or change the TCP information, or both, thus relieving significant processing resources on the storage nodes.

Moreover, this permits for a number of interesting capabilities when the network switch can recognize and react to the TCP information, which is typically unavailable. These include triangle routing, packet or segment ordering, queue-aware forwarding, fencing, etc.

Also of interest, is that this functionality occurs at the forwarding plane level (i.e. hardware/forwarding lookup tables) in order to ensure throughput associated with routers and switches and which would not be ordinarily possible using control plane functionality.

Other aspects, features and/or advantages will become more apparent upon reading of the following non-restrictive description of specific embodiments thereof, given by way of example only with reference to the accompanying drawings.

BRIEF DESCRIPTION OF THE FIGURES

The invention, both as to its arrangement and method of operation, together with further aspects and advantages thereof, as would be understood by a person skilled in the art of the instant invention, may be best understood and otherwise become apparent by reference to the accompanying schematic and graphical representations in light of the brief but detailed description hereafter.

The invention, both as to its arrangement and method of operation, together with further aspects and advantages thereof, as would be understood by a person skilled in the art of the instant invention, may be best understood and otherwise become apparent by reference to the accompanying schematic and graphical representations in light of the brief but detailed description hereafter.

DETAILED DESCRIPTION

Figure 1:
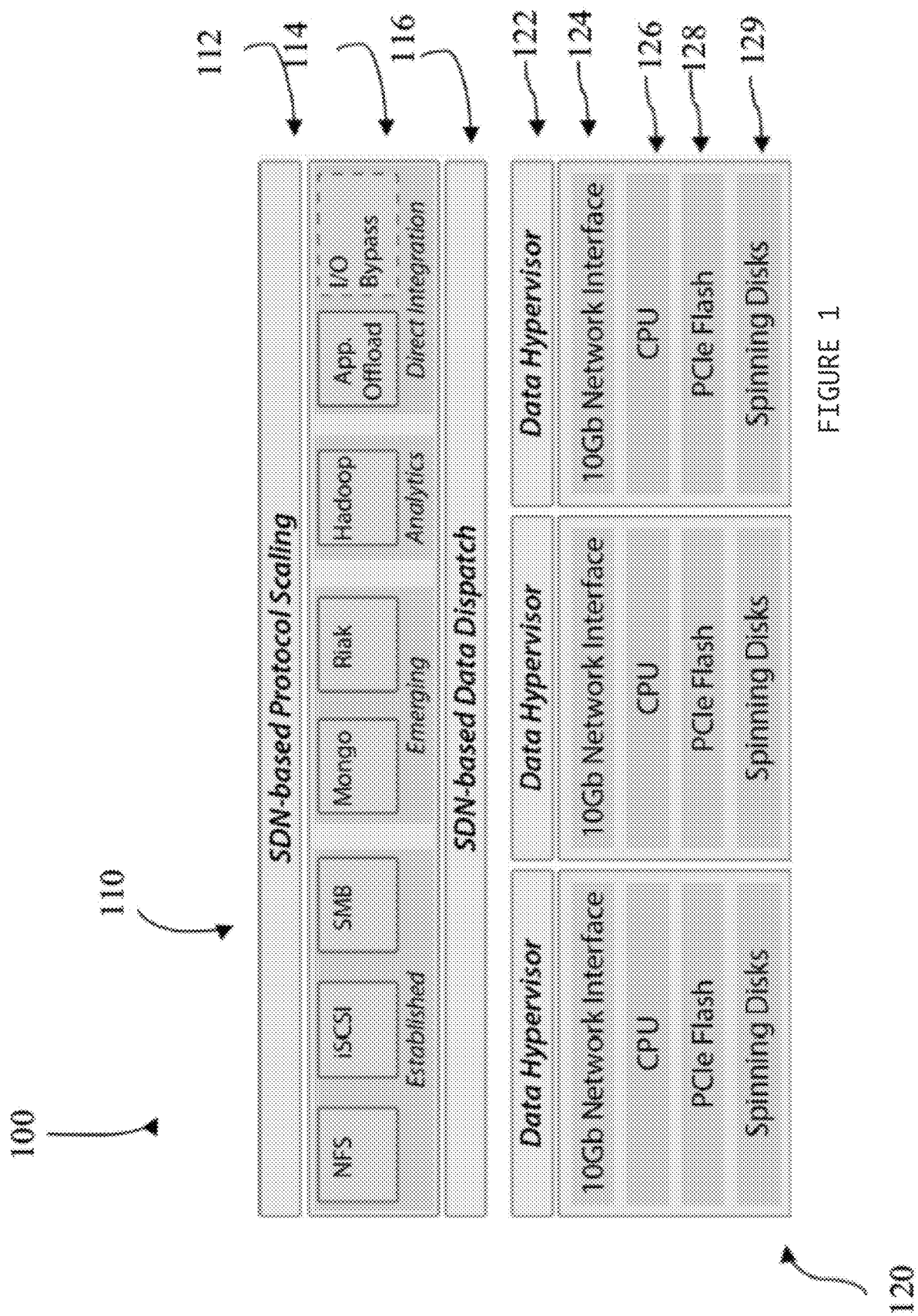
FIG. 1 is a schematic diagram representative of an architecture of one embodiment of the functionalities in a distributed storage system.

The present invention will now be described more fully with reference to the accompanying schematic and graphical representations in which representative embodiments of the present invention are shown. The invention may however be embodied and applied and used in different forms and should not be construed as being limited to the exemplary embodiments set forth herein. Rather, these embodiments are provided so that this application will be understood in illustration and brief explanation in order to convey the true scope of the invention to those skilled in the art. Some of the illustrations include detailed explanation of operation of the present invention and as such should be limited thereto. As would be known to a person skilled in the art, computing components, such as processors and/or memory resources for computing devices may be implemented in a variety of arrangements, including when such components are located together in the same component, in different communicatively coupled components in the same device, or located remotely and accessible across a communication medium.

As used herein, a "computing device" may include virtual or physical computing device, and also refers to any device capable of receiving and/or storing and/or processing and/or providing computer readable instructions or information.

As used herein, "memory" may refer to any resource or medium that is capable of having information stored thereon and/or retrieved therefrom. Memory may refer to any of the components, resources, media, or combination thereof, that retain data, including what may be historically referred to as primary (or internal or main memory due to its direct link to a computer processor component), secondary (external or auxiliary as it is not always directly accessible by the computer processor component) and tertiary storage, either alone or in combination, although not limited to these characterizations. Although the term "storage" and "memory" may sometimes carry different meaning, they may in some cases be used interchangeably herein.

As used herein, a "storage resource" may comprise a single medium or unit, or it may be different types of resources that are combined logically or physically. The may include memory resources that provide rapid and/or temporary data storage, such as RAM (Random Access Memory), SRAM (Static Random Access Memory), DRAM (Dynamic Random Access Memory), SDRAM (Synchronous Dynamic Random Access Memory), CAM (Content-Addressable Memory), or other rapid-access memory, or more longer-term data storage that may or may not provide for rapid access, use and/or storage, such as a disk drive, flash drive, optical drive, SSD, other flash-based memory, PCM (Phase change memory), or equivalent. A memory resource may include, in whole or in part, volatile memory devices, non-volatile memory devices, or both volatile and non-volatile memory devices acting in concert. Other forms of memory, irrespective of whether such memory technology was available at the time of filing, may be used without departing from the spirit or scope of the instant disclosure. For example, any high-throughput and low-latency storage medium can be used in the same manner as PCIe Flash, including any solid-state memory technologies that will appear on the PCIe bus. Technologies including phase-change memory (PCM), spin-torque transfer (STT) and others will more fully develop. Some storage resources can be characterized as being high- or low-latency and/or high- or low-throughput and/or high- or low-capacity; in many embodiments, these characterizations are based on a relative comparison to other available storage resources on the same data server or within the same distributed storage system. For example, in a data server that comprises one or more PCIe Flash as well as one or more spinning disks, the PCIe flash will, relative to other storage resources, be considered as being lower latency and higher throughput, and the spinning disks will be considered as being higher latency and higher throughput. Higher or lower capacity depends on the specific capacity of each of the available storage resources, although in embodiments described herein, the form factor of a PCIe flash module is of lower capacity than a similarly sized form factor of a spinning disk. A storage resource may be a memory component, or an element or portion thereof, that is used or available to be used for information storage and retrieval.

A "computer processor component" refers in general to any component of a physical computing device that performs arithmetical, logical or input/output operations of the device or devices, and generally is the portion that carries out instructions for a computing device. The computer processor component may process information for a computing device on which the computer processor component resides or for other computing devices (both physical and virtual). It may also refer to one or a plurality of components that provide processing functionality of a computer processor component, and in the case of a virtual computing device, the computer processor component functionality may be distributed across multiple physical devices that are communicatively coupled. A computer processor component may alternatively be referred to herein as a CPU or a processor.

As used herein, the term "client" may refer to any piece of computer hardware or software that accesses a service made available by a server. It may refer to a computing device or computer program that, as part of its operation, relies on sending a request to another computing device or computer program (which may or may not be located on another computer or network). In some cases, web browsers are clients that connect to web servers and retrieve web pages for display; email clients retrieve email from mail servers. The term "client" may also be applied to computers or devices that run the client software or users that use the client software. Clients and servers may be computer programs run on the same machine and connect via inter-process communication techniques; alternatively, they may exist on separate computing devices that are communicatively coupled across a network. Clients may communication with servers across physical networks which comprise the internet. In accordance with the OSI model of computer networking, clients may be connected via a physical network of electrical, mechanical, and procedural interfaces that make up the transmission. Clients may utilize data link protocols to pass frames, or other data link protocol units, between fixed hardware addresses (e.g. MAC address) and will utilize various protocols, including but not limited to Ethernet, Frame Relay, Point-to-Point Protocol. Clients may also communicate in accordance with packetized abstractions, such as the Internet Protocol (IPv4 or IPv6) or other network layer protocols, including but not limited to Internetwork Packet Exchange (IPX), Routing Information Protocol (RIP), Datagram Delivery Protocol (DDP). Next, end-to-end transport layer communication protocols may be utilized by certain clients without departing from the scope of the instant disclosure (such protocols may include but not limited to the following: AppleTalk Transaction Protocol ("ATP"), Cyclic UDP ("CUDP"), Datagram Congestion Control Protocol ("DCCP"), Fibre Channel Protocol ("FCP"), IL Protocol ("IL"), Multipath TCP ("MTCP"), NetBIOS Frames protocol ("NBF"), NetBIOS over TCP/IP ("NBT"), Reliable Datagram Protocol ("RDP"), Reliable User Datagram Protocol ("RUDP"), Stream Control Transmission Protocol ("SCTP"), Sequenced Packet Exchange ("SPX"), Structured Stream Transport ("SST"), Transmission Control Protocol ("TCP"), User Datagram Protocol ("UDP"), UDP Lite, Micro Transport Protocol ("µTP"). Such transport layer communication protocols may be used to transport application-level data, including RPC and NFS, among many others which would be known to a person skilled in the art. Network communication may also be described in terms of the TCP/IP model of network infrastructure; that is, the link layer, internet layer, transport layer, and application layer. In general, applications or computing devices that request data from a server or data host may be referred to as a client. In some cases, a client and the entity that is utilizing the client may jointly be referred to as a client; in some cases, the entity utilizing the client is a human and in some cases it may be another computing device or a software routine.

As used herein, the term "server" refers to a system or computing device (e.g. software and computer hardware) that responds to requests from one or more clients across a computer network to provide, or help to provide, a network service. The requests may be abstracted in accordance with the OSI layer model or the TCP/IP model. Servers may provide services across a network, either to private users inside a large organization or to public users via the Internet.

As used herein, "latency" of memory resources may be used to refer to a measure of the amount of time passing between the time that a storage resource receives a request and the time at which the same data resource responds to the request.

As used herein, "throughput" of memory resources refers to the number of input/output operations per second that a storage resource can perform. Typically, the unit of measurement is known as "IOPS" although other units may be used.

As used herein, a "data transaction" may refer to any instructions or requests relating to the reading, writing, updating, and/or calling of data; in some embodiments, the term may refer to instructions to process a client request, including any information that is carried by the data transaction necessary to carry out such processing. Data transactions may comprise of (i) client requests, which in the context of a data storage system comprise data requests, generally issued by data clients or by entities requesting an action be taken with specific data (e.g. read, write, update), as well as (ii) client request responses, which in the context of a data storage system may include data request responses, generally returned by servers in response to a data request. In embodiments, client requests originate at clients; in embodiments, they may originate from applications running on or at a client. In embodiments, clients requests are sent to servers and then responded to appropriately, and a response is returned to the client. In embodiments, client requests that are data requests may be asymmetrical in that a write request generally carries a relatively large amount of data from data client to the distributed data storage system, since it must include the data to be written, and the data storage system returns a relatively much smaller response that acknowledges receipt and confirms that the data was written to memory; in embodiments, a read request is relatively small amount of data, whereas the response to the read request from the data storage system is the data that was read and is therefore much larger than the request, relatively speaking Client requests are often made in accordance with an application or session layer abstraction; in embodiments, they are instructions from one computing device (or other endpoint) to implement an action or a subroutine or a process at another computing device. In embodiments, client requests are sent over the network as NFS requests (application-layer data) contained within TCP segments (endpoint-to-endpoint transport-layer data stream) which are carried in IP packets over the internet, across Ethernet-based devices within frames across networking devices. Other exemplary client requests may be sent as part of RPC (Remote Procedure Call) requests, which may in turn comprise NFS requests or other types of client requests. Other examples of file systems which may support types of data requests and data responses include iSCSI, SMB, Fibre Channel, FAT, NTFS, RFS, as well as any other file system requests and responses which would be known to persons skilled in the art of the instant disclosure. In embodiments utilizing NFS, an NFS request, and its corresponding response, would each be considered a data transaction.

In general, the subject matter disclosed herein relates to systems, methods and devices relating to the use and/or exploitation of a coordinated and/or distributed network communication between a client, on the one hand, and a plurality of servers on the other. In embodiments, the plurality of servers are presented as a single logical unit to the client and may be accessed under, for example, a single IP address (or other protocol address unit or reference). While a majority of the examples and embodiments described herein relate to distributed data storage systems, in general comprising of at least one data servers, which primarily provide data storage, the instantly disclosed subject matter is also applicable in other contexts, and can, for example, serve up a number of processes or functionalities other than storage. This may include application-layer functionalities and processes, for example. In embodiments, the network communication between the client and the plurality of servers is, from the perspective of the client, treated as a direct communication between the client and the logical unit presented by the plurality of servers. This is, in embodiments, accomplished in part by permitting the plurality of servers to engage in such communications as if the communication was originating from a particular physical endpoint. This may be accomplished in a number of ways, but in general involves the ability of at least some of the plurality of servers to participate in the coordinated communication, by one of: ceasing the communication between the client and server and restarting with another server; migrating the communication having a first server as an endpoint to another server; permitting a second server to send communications that can be inserted or included in the communication between a first server and the client; permitting one or more servers to provide portions of a communication to a client that are combined into a consolidated communication; or some combination thereof.

In some embodiments, the plurality of the servers are configured to communicate amongst themselves to participate in the coordinated network communication. In other embodiments, a network switch is configured to participate in both the act of coordinating the network communication, but also making the communication more efficient. In embodiments, the switch has various levels of functionality: it may serve merely as an interface to the plurality of servers (and thus provide certain ancillary functionalities, such as security or providing other session-, presentation-, or application-layer functionality); the switch may combine communication from two or more servers and combine that information by, for example, (i) putting portions of the communication into a coordinated data stream, (ii) amending state information associated with a communication, or a portion thereof, to make the communication appear as though it originated from the server from which the client expects the data, (iii) inserting a portion of a communication from one server into a communication stream or connection between the client and another server. In other cases, the switch may impose control over the routing of the communications by directing communications, or portions thereof, to those servers that are most suitable to handle the transaction or process (because, for example, in a data storage transaction the data is or will be stored on that server, or that server is less busy, more secure, has lower latency, or is otherwise more suitable to the applicable data or process). As such, in some embodiments that comprise a switch, the switch can be said to be completely passive in that it simply passes communication to any server and the plurality of servers become responsible to determine which server should handle the communication and any applicable response. In other cases, the switch can determine which server should handle the response, and either pass this information on to the plurality of servers or it may direct the communication (or portion thereof) to the applicable server or servers. In other cases, the switch may act to coordinate the communication into a single communication; either by causing a responsive communication that originates from two more servers to be made into a coordinated communication (by, for example, re-ordering the portions of the communication or by amending the state information of the portions to make them appear as though they originated from a particular end-point or in a particular order), or by inserting a portion of a communication from a server into a communication that is established between the client and another server. In some embodiments, the switch may perform some combination of these functions.

In one embodiment, there is provided a storage node in a distributed storage system comprising a plurality of storage nodes, the storage node being configured for participation in a distributed network communication between a data client and the distributed storage system, the storage node comprising: at least one storage resource that is configured to store at least: a set of instructions and data related to data requests; a network interface for communicatively coupling, over one or more networks, the storage node to data clients and at least one other storage node in the distributed storage system; a computer processor module for carrying out the set of instructions that, when carried out, cause the storage node to send a data request response in the distributed network communication to the data client, when data related to the data request is associated with the at least one storage resource upon receipt of at least one of the following: the data request and communication data channel information from the distributed network communication; wherein said communication data channel information comprises information relating to one of the following group: the state of the distributed network communication and the data request.

In embodiments, the storage node is a data server in a distributed storage system. While some embodiments include other kinds of servers or nodes in the plurality of servers, when the server is intended to store data, it may be referred to as a storage node. The use of other kinds of servers as nodes may be used without departing from the scope or nature of the instant disclosure. In some cases, the storage node will comprise a communication end-point, however, due to the distributed nature of the coordinated communication, in many cases there may be a plurality of simultaneous end-points and/or the end-point may change during the course of a communication and/or the end-point in communication with the client may pass on the communication to another node or obtain information for the communication from another node; as such, the node may resemble an end-point but is in fact cooperating with other nodes.

Typical computing servers, which may act as the nodes, can include one or more of the following: database server, file server, mail server, print server, web server, gaming server, application server, or some other kind of server. Nodes in embodiments of the instant disclosure may be referred to as servers. Servers may comprise one or more storage resources thereon, and may include one or more different types of data storage resource. In embodiments of the distributed storage systems disclosed herein, storage resources are provided by one or more servers which operate as data servers. The one or more data servers may be presented to clients as a single logical unit, and in some embodiments will share the same IP address; data communication with such one or more groups can share a single distributed data stack (such as NFS requests over TCP, but other transport layer data streams or communication means are possible). In some cases, the servers will jointly manage the distributed data stack; in other cases, the distributed data stack will be handled by the switch; and in yet other cases a combination of the switch and the one or more servers will cooperate to handle the distributed data stack.

In embodiments, client applications communicate with data servers, which act as storage nodes in a data storage system, to access data resources in accordance with any of a number of application-level storage protocols, including but not limited to Network File System ("NFS"), Internet Small Computer System Interface ("iSCSI"), and Fiber Channel. Other storage protocols known to persons skilled in the art pertaining hereto may be used without departing from the scope of the instant disclosure. Additionally, object storage interfaces such as Amazon's S3, analytics-specific file systems such as Hadoop's HDFS, and NoSQL stores like Mongo, Cassandra, and Riak are also supported by embodiments herein.

In embodiments, the storage resources are any computer-readable and computer-writable storage media that are communicatively coupled to the data clients over a network. In embodiments, a data server may comprise a single storage resource; in alternative embodiments, a data server may comprise a plurality of the same kind of storage resource; in yet other embodiments, a data server may comprise a plurality of different kinds of storage resources. In addition, different data servers within the same distributed data storage system may have different numbers and types of storage resources thereon. Any combination of number of storage resources as well as number of types of storage resources may be used in a plurality of data servers within a given distributed data storage system without departing from the scope of the instant disclosure.

In embodiments, a particular data server comprises a network data node. In embodiments, a data server may comprise multiple enterprise-grade PCIe-integrated components, multiple disk drives, a CPU and a network interface controller (NIC). In embodiments, a data server may be described as balanced combinations of PCIe flash, multiple 3 TB spinning disk drives, a CPU and 10 Gb network interfaces that form a building block for a scalable, high-performance data path. In embodiments, the CPU also runs a storage hypervisor which allows storage resources to be safely shared by multiple tenants, over multiple protocols. In some embodiments, the storage hypervisor, in addition to generating virtual memory resources from the data server on which the hypervisor is running, the hypervisor is also in data communication with the operating systems on other data servers in the distributed data storage system, and thus can present virtual storage resources that utilize physical storage resources across all of the available data resources in the system. The hypervisor or other software on the data server may be utilized to distribute a shared data stack. In embodiments, the shared data stack comprises a TCP connection with a data client, wherein the data stack is passed or migrates from data server to data server. In embodiments, the data servers can run software or a set of other instructions that permits them to pass the shared data stack amongst each other; in embodiments, the network switching device also manages the shared data stack by monitoring the state, header, or content information relating to the various protocol data units (PDU) passing thereon and then modifies such information, or else passes the PDU to the data server that is most appropriate to participate in the shared data stack.

In embodiments, storage resources within memory can be implemented with any of a number of connectivity devices known to persons skilled in the art; even if such devices did not exist at the time of filing, without departing from the scope and spirit of the instant disclosure. In embodiments, flash storage devices may be utilized with SAS and SATA buses (~600 MB/s), PCIe bus (~32 GB/s), which support performance-critical hardware like network interfaces and GPUs, or other types of communication system that transfers data between components inside a computer, or between computers. In some embodiments, PCIe flash devices provide significant price, cost, and performance tradeoffs as compared to spinning disks. The table below shows typical data storage resources used in some exemplary data servers.

|  | Capacity | Throughput | Latency | Power | Cost |
| --- | --- | --- | --- | --- | --- |
| 15K RPM Disk | 3 TB | 200 IOPS | 10 ms | 10 W | $200 |
| PCIe Flash | 800 GB | 50,000 IOPS | 10 μs | 25 W | $3000 |

In embodiments, PCIe flash is about one thousand times lower latency than spinning disks and about 250 times faster on a throughput basis. This performance density means that data stored in flash can serve workloads less expensively (16× cheaper by IOPS) and with less power (100× fewer Watts by IOPS). As a result, environments that have any performance sensitivity at all should be incorporating PCIe flash into their storage hierarchies. In embodiments, specific clusters of data are migrated to PCIe flash resources at times when these data clusters have high priority; in embodiments, data clusters having lower priority at specific times are migrated to the spinning disks. In embodiments, cost-effectiveness of distributed data systems can be maximized by either of these activities, or a combination thereof. In such cases, a distributed storage system may cause a write request involving high priority (i.e. "hot") data to be directed to available storage resources having a high performance capability, such as flash; in other cases, data which has low priority (i.e. "cold") is moved to lower performance storage resources. In both cases, the system is capable of cooperatively diverting the communication to the most appropriate storage node(s) to handle the data for each scenario. In other cases, if such data changes priority and some or all of it is transferred to another node (or alternatively, a replica of that data exists on another storage node that is more suitable to handle the request or the data at that time), the switch and/or the plurality of storage nodes can cooperate to participate in a communication that is distributed across the storage nodes deemed by the system as most optimal to handle the response communication; the client may, in embodiments, remain unaware of which storage nodes are responding or even the fact that there are multiple storage nodes participating in the communication.

In some embodiments, the speed of PCIe flash may have operational limitations; for example, at full rate, a single modern PCIe flash card is capable of saturating a 10 GB/s network interface. As a result, prior techniques of using RAID and on-array file system layers to combine multiple storage devices does not provide additional operational benefits in light of the opposing effects of performance and cost. In other words, there may be no additional value on offer, other than capacity, which can be provided by lower-cost and lower performing memory storage, to adding additional expensive flash hardware behind a single network interface controller on a single data server. Moreover, unlike disks, the performance of flash in embodiments may be demanding on CPU. Using the numbers in the table above, the CPU driving the single PCIe flash device has to handle the same request rate of a RAID system using 250 spinning disks.

In general, PCIe flash is about sixty times more expensive by capacity. In storage systems comprising a plurality of storage resource types, capacity requirements gravitate towards increase use of spinning disks; latency and throughput requirements gravitate towards flash. In embodiments, there is provided a dynamic assessment of priority of data across the data stored in the system and using that information to place data into the most appropriate storage resource type.

The distributed network communication is a transmission of information between a client and the distributed server system. It may in some embodiments constitute an end-to-end communication therebetween, wherein for some embodiments the handling of the end-point at the distributed server end is handled by a plurality of the servers, either by passing the communication from server to server or alternatively, allowing another server to participate in the communication. In some embodiments, the communication is a transport-layer communication between a client and the plurality of servers; in other embodiments, the communication may be physical-, datalink-, network-, session-, presentation-, or even application-layer communications. In embodiments, there is provided a transport-layer communication which is a stream-abstracted communication in which a stream of data is communicated from the clients to servers and a stream of data is returned in response thereto. A stream-oriented communication is a series of data units having some degree of interdependence in that they are related to one another by virtue of being part of the same stream of data; in some cases, the stream will be substantially sequential which is received in a particular order. In some current network nodes, often depending on the size of an available buffer, some minor, localized reordering can be implemented. This will often result in some reliable protocols causing a delay in transmission based on the assumption that out of order data units is caused by network congestion, so the capability of embodiments of the network switch herein to amend data units with different sequence numbers that reflect that actual order of reception of data units, in cases where the client need not receive the data units in order, can facilitate faster transmission even if data units are out of order because of being sent by different nodes in the distributed system. In other cases, the communication may be datagram-oriented; this refers to one or more data units that are self-contained or independent of other data units. Datagram-oriented transmission may, for example, be used in transport-layer communications which require fast, low-latency transfer, particularly where the loss of a small number of packets are not critical to the transmission (e.g. VOIP); often in these cases, the transport-layer serves the end-point to end-point communication to the application-layer which provides the ordering and other reliability and error checking processes. Embodiments may also support network communication that is either connection-oriented or connectionless. In connection-oriented communication wherein a communication session or connection is semi-permanently or persistently established between two end-points. Of course in the instant subject matter, the end-point at the distributed server system is handled by a plurality of the servers that appear or is handled as a single endpoint from the perspective of the client. In a connectionless communication, each data unit may be individually addressed and routed based on information carried in each unit, rather than in the setup information of a prearranged, fixed data channel, Under connectionless communication between two network end points, a message can be sent from one end point to another without prior arrangement. The device at one end of the communication transmits data addressed to the other, without first ensuring that the recipient is available and ready to receive the data. Internet Protocol (IP) and User Datagram Protocol (UDP) are connectionless protocols. TCP, ATM, Frame Relay and MPLS are examples of connection-oriented protocols. In some cases, a connection-oriented communication may comprise a virtual circuit. A network communication may comprise of, and be jointly referred to herein as, requests transmitted in one direction, for example by a client to a server, and request responses in the other direction, for example from the server to the requesting client. In embodiments relating to a data storage system, data requests comprise of one or more of read requests, write requests, or update requests constitute a communication; data request responses comprise of the data returned from the read request or a confirmation from either a write request or an update request. As such, the term network communication as used herein may refer to a communication between endpoint nodes over a network. It may be used to refer to the exchange or session between the nodes, which may in some cases be a single, one-way data unit from one endpoint to the other endpoint. Alternatively, it may be a continuous, sequenced, bidirectional, stream of data units between endpoints. Other combinations of datagram-oriented, stream oriented, connectionless or connection-oriented are possible for network communications described herein. It may refer to any communication protocol used at any layer of the OSI model or Internet protocol suite.

In embodiments, a data client comprises a client computer that interacts with a distributed data storage system to store and access data therein. In some embodiments, the data client may refer to the computing device that is generating data requests; in other cases, it may refer to a process or application running on one or more computing devices. As noted elsewhere in this disclosure, other forms of clients may interact with distributed server systems that are not restricted to data storage systems without departing from the scope and nature of the instant disclosure.

In embodiments, the distributed storage system comprises one or more storage nodes, wherein at least of which are communicatively coupled over a network. In some embodiments, a network switching device is provided that interfaces the distributed storage system with data clients.

In embodiments, a network interface is any computing component that provides an avenue for communication by the node or computing device that communicatively links a computing device to a network for communication. In embodiments, the network interface may comprise a network interface controller ("NIC").

In embodiments, data related to the data request comprises, in the case of a read request, the data that is being or is sought to be read in response to the request, or the in the case of a write or update request, is the data that is transmitted to the data storage system to be written thereon. In this regard, such data is associated with a storage resource if, in the case of a read request, the data or a replica thereof currently resides on that storage resource; in the case of write request, such data is associated with the storage resource is associated therewith if such storage resource will be or has been designated to store the data, or otherwise will have the data stored thereon. Since data transactions, which comprise of either or both of a data request and its related data request response, can be associated with one or more storage resources, particularly in the case of a write request, when the data is not yet resident on the one or more storage nodes. In embodiments, data related to a data request may be associated concurrently with one or more storage nodes. For example, there may be replicas of the same data located on multiple storage nodes; alternatively, if data is currently residing on one or more first storage nodes, due to failure, dynamic tiering or caching policies, or decrease in some performance objective, such data may become associated with another one or more other storage nodes and be migrated or transferred there, and such data will be associated with such one or more other storage nodes. A storage node associated with data related to a data request is a storage node that contains data or will contain data, on a storage block thereon, that is or will be responsive to the data request. For example, in the case of read request, the storage node is associated with the data related to the data request because the data will be returned from the read request is stored on that node; in the case of a write request, the storage node is associated with the data related to the data request because the data from the write request will be written to that node.

In embodiments, a data unit is a discrete entity of data sent via a communication. In some embodiments, a data unit may include a payload and header information; the payload may include the data that is to read or written pursuant to a data request or a data request response or it may refer to a data unit of a higher layer that is being carried by that lower-layer data unit, and the header information may refer to control information relating to the control of that data unit (such as, for example, source or destination addresses, sequence information, protocol information, checksum information and other information relating to the treatment or control of that data unit). Data units may refer to a protocol data unit (or PDU), which may or may not correlate to the data unit of the communication layer over which they are communicated. For example, a data unit may refer to any one or more of the following non-limiting list of exemplary PDUs: bit, frame, packet, segment, and/or datagram. A service data unit (or SDU) may refer the data unit that is served by layers above the layer of a particular data unit. As a purely illustrative example, an Ethernet frame, may carry as its payload, an IP packet, which in turn carries as its payload, a TCP segment, which in turn carries as its payload an application-layer data unit such as an NFS read request.

In embodiments, some information may comprise communication data channel information, which provides information relating to the state of a storage node with respect to a communication. It may refer to the state of a data unit with respect to a communication of which it is a part (as non-limiting examples, sequence number, source and destination addresses, size, etc.). In general, communication data channel information relates to information that permits a storage node to participate in a communication, or permits a storage node or network switching device to include a data unit in a communication between a client and any storage node in the distributed storage system. The statefulness or statelessness of a storage node with respect to a given communication may be determined according to the communication data channel information associated with a data unit. The statefulness or statelessness of a data unit with respect to a given communication may be determined according to the communication data channel information associated with that data unit. In some cases, the control information in a data unit may be communication data channel information.

In embodiments, the state of a distributed network communication may refer to any information that defines or determines the condition of the network communication relative to endpoints in the communication, other network communications, or data units in that or other network communications. For example, a distributed network communication may be stateless with respect to a particular end-point, meaning that end-point is not participating in the communication; conversely, the distributed network communications may be stateful with respect to an end-point when that end-point is participating in the communication. State information is any information that can define or describe the state of the communication with respect to any element or communication of the distributed storage system.

A data unit can be stateful or stateless with respect to a communication, storage node, data client, network switch, or other data units. For example, a data unit may have sequence numbers which define that data unit's state with respect to other data units in the same streamed communication.

In some embodiments, the data storage system comprises one or more network switching devices which communicatively couple data clients with data servers. Network switching devices may be used to communicatively couple clients and servers. Some network switching devices may assist in presenting the one or more data servers as a single logical unit; for example, as a single virtual NFS server. In other cases, the network switching device also views the one or more data servers as a single unit with the same IP address and passes on the data stack, and the data servers operated to distribute the data stack. In some cases, the network switching devices may be referred to herein as "a switch".

Exemplary embodiments of network switching devices include, but are not limited to, a commodity 10 Gb Ethernet switching device as the interconnect between the data clients and the data servers; in some exemplary switches, there is provided at the switch a 52-port 10 Gb Openflow-Enabled Software Defined Networking ("SDN") switch (and supports 2 switches in an active/active redundant configuration) to which all data servers and clients are directly attached. SDN features on the switch allow significant aspects of storage system logic to be pushed directly into the network in an approach to achieving scale and performance. In some embodiments, the switch may facilitate the use of a distributed transport-layer communication (or indeed session-layer communication) between a given client and a plurality of data servers (or hosts or nodes).

In embodiments, the one or more switches may support network communication between one or more clients and one or more data servers. In some embodiments, there is no intermediary network switching device, but rather the one or more data servers operate jointly to handle a distributed data stack. An ability for a plurality of data servers to manage, with or without contribution from the network switching device, a distributed data stack contributes to the scalability of the distributed storage system; this is in part because as additional data servers are added they continue to be presented as a single logical unit (e.g. as a single NFS server) to a client and a seamless data stack for the client is maintained and which appears, from the point of view of the client, as a single endpoint-to-endpoint data stack.

In another embodiment, there is provided a network switching device for managing a coordinated distributed network communication of data transactions between a data client and a distributed file system comprising a plurality of storage nodes, the network switching device comprising: at least one network interface for receiving and sending data units, the data units comprising encapsulated distributed network communication of data transactions; a storage resource; and a forwarding module, the forwarding module comprising a forwarding table comprising data unit identification information and respective data unit action information; and a forwarding module processor that (i) extracts data unit information, the data unit information comprising information associated with at least one of: the data transaction and the encapsulated distributed network communication of the data transaction, and (ii) compares data unit information with the forwarding table and actions the received data unit in accordance with the matching data unit forwarding information; a forwarding path module that compares each received data unit with the forwarding table and forwards the received data unit in accordance with the matching data unit forwarding information; and a control module configured to: amend the forwarding table based on the data unit information and storage resource information, the storage resource information comprising at least one of: a current location of data associated with a data unit, current operational characteristics of at least one of the storage resources, and a combination thereof; wherein the coordinated distributed network communication is distributed across at least two of the plurality of storage units.

In embodiments of the instantly disclosed subject matter, there are a number of different levels of functionality of the network switching device. The network switching device can serve merely as an interface to the distributed server system. In a distributed storage system, for example, the switch may provide a passive interface that passes along the data unit(s) of the communication, in which case, determining the storage node associated with the data of the data unit is left entirely to the storage nodes themselves. That is not to say that network switching device does not, even for a passive switch, provide other ancillary functions, such as firewall or other security features.

The network switching device may provide a more active level of participation in the distributed network communication; in such cases, active network switching devices can read and make actions based on data within the data unit. This may include an assessment of the header information as well as the payload data to determine, for example, a recognition of the data request in the payload SDU of a TCP segment so that the network switching device can route the PDU directly to the storage node that is associated with that data request. In some cases, there may be sufficient information available in the header information; in others, the information will require parsing out the payload information in the SDU and in cases keeping track of that information in a buffer or other local memory, especially in stream-oriented communications, such as TCP (since sequentiality in the payload data, i.e. NFS requests and responses, will be important in understanding the information therein). In other active network switching devices, the switch may actually amend the header information of the PDU or even SDU (or even higher layer data unit in the payload of the PDU); this may be include amending sequence information to permit a data request response, which is returned over a stream-oriented reliable communication such as TCP, to be accepted by a client in a different order than what the original sequence information would have indicated but in respect of which can nevertheless provide the response out of order without any reduction in the usefulness of that response. In this example, this would prevent the TCP protocol from slowing down transmission under the assumption that the network is experiencing congestion. In the case of a distributed communication, such as a distributed shared TCP connection, where a plurality of the storage nodes are contributing to such stream, there may be cases where, primarily due to some nodes having varying latency or queue times, nodes may provide data units comprising the data request response in a different order than the requests were received by the system; the switch can re-write the sequence information to ensure this does not cause the client to reject or slow down transmission of the communication. In other cases, the switch may in fact re-order the data units when it receives data units out of order, wherein the switch will save a data unit that has been received too early in a sequence, until the appropriate data units that are earlier in the stream sequence have been received and sent. In other cases, the switch may be more active in controlling the activities of the storage nodes by providing confirmation to a stateful storage node, before which the storage node will not send a data unit in the communication, such confirmation being made to keep data units in the proper order irrespective of the performance of the storage node and when and how it participates in the communication. In some cases, where, for example, an RPC, such as an NFS data request, is larger than a given data unit, the network switching device may defragment or combine the data units into a single data unit which can be provided directly to the associated storage node. Of course, in such cases the resulting defragmented or combined data unit must not exceed the maximum transmission unit (MTU) size permitted over the distributed storage system. In other cases, a data unit which carries more than one RPC, such as an NFS request, may be fragmented and sent as separate data units to different storage nodes, each of which being associated with the respective NFS requests.

In some embodiments, the network switching device will comprise of a forwarding module (sometimes referred to as a forwarding plane) and a control module (sometimes referred to as a control plane). The forwarding plane will comprise of a fast-path for implementing a specific action as detailed in a high-speed look-up table. The high speed forwarding table may comprise destination addresses that are associated with identifying information that can be associated with specific data units or classes of data units. In addition to destinations, the forwarding table may comprise certain actions that should be undertaken for specific data units or classes of data units. The actions may, for example, include but are not limited to: re-ordering, re-routing to a different storage node (if the destination specified in the data unit, for example, is not associated with the data related to the data unit, or the specified storage node has been fenced off or has become otherwise unavailable or have reduced availability), fragmenting or defragmenting data units, and combinations thereof. The forwarding plane may in some embodiments be implemented in specialized, high-speed hardware such as content addressable modules (CAMs and TCAMs). The forwarding plane comprises some high-speed processing capability to carry out the actions in the forwarding table, such as to amend sequence information, source information in data units carrying data response requests, to amend checksum information and other header information (including pseudo-header information, which may be determined en route from other information in the data unit, or higher- or lower-layer data units associated therewith); this may be, inter alia, to facilitate communication of data units coming from distributed end-points that should be treated by the client as coming from the same end-point, to store units in buffers for a predetermined interval before sending, or reassessing whether the data units should be sent, whether and how data units can be defragmented, among other actions. By performing these in that forwarding plane, the network switching device can maintain the speed necessary to operate as a network switch. The control plane of a network switching device comprises a more general purpose processor which is intended to perform actions on data units when the required action is not specified in the forwarding table, or when an action in the forwarding table needs to be amended.

In embodiments, there is provided network switching device that is programmable and that is both aware of the data that it is transporting over the network, as well as certain characteristics of the distributed storage system, such as current and predicted operational characteristics of the storage nodes therein (including latency, throughput, queue time, vulnerability, capacity, etc.). This will allow the implementation of a number of functionalities on the switch to more efficiently and effectively direct storage traffic in ways that have not previously been possible due to the architecture of networks. These functionalities listed and described more fully below are examples, and other functionalities may be implemented. The capability to look at payload information of protocol data units may facilitate additional functionalities such as load distribution or queue-aware forwarding. The above generalized description is intended to capture at least the following non-limiting list of functionalities:

i. the extraction and analysis is done for the purpose of directing data specifically for a distributed data storage system (which comprises multiple storage resources, e.g. multiple nodes each having one or more storage media thereon, all of which may appear to the client as a single logical unit having a single TCP address);
  ii. there is analysis of either or both of the extracted payload data and the storage resources (e.g. nodes);
  iii. the switch can maintain extracted payload data from other data units and use this to determine more efficient ways of mapping or distributing data, including to "fence off" storage nodes having, for example, reduced performance or out-of-date data and keeping them fenced-off until the performance improves and the copy of the data has been updated;
  iv. the switch can store data units (for sending them later, e.g. to resolve out-of-order TCP segments); and
  v. the extraction can be from any layer of payload data that is not visible to the switch.

In another embodiment, there is provided a method of coordinating a distributed network communication of data transactions between a data client and a plurality of storage nodes in a distributed storage system, the method comprising the following steps: (a) Receiving from a data client at the distributed storage system a distributed network communication of at least one data request; (b) For each data request, determining which storage node is associated with the data related to each data request; and (c) For each data request, forwarding communication data channel information relating to the distributed network communication of the data request to each storage node associated with data related to each data request, wherein communication data channel information comprises information relating to one of the following: the state of a distributed network communication, the data request, and a combination thereof; and (d) Using the communication data channel information to generate a coordinated distributed network communication of data response to the at least one data requests.

In embodiments with no network switching device, a passive network switching device, or even an active network switching device (which has not been programmed as such), steps of the above method may be implemented by the plurality of storage nodes. For example, the storage nodes themselves may have logic installed thereon that permits them to determine which is the associated storage node; the storage nodes may forward communication data channel information to another node (either the associated node, or another node which in turn may pass it on if it is not the associated node); and the storage nodes may jointly participate in generating a coordinated communication, such as a connection-oriented TCP communication, by migrating the connection to the storage node associated with the requested data at the appropriate time. In other embodiments having a network switching device, some or all of these steps may be provided by the network switching device or a combination of the network switching device and the storage nodes.

In some embodiments, identifying the storage node that is associated with the data related to the data request can be accomplished in a number of different methodologies; these methodologies include random, multicast, propagated, characteristic-based, and a pre-determined mapping. In the case of random, the communication end-point at the server end is determined at random and if the selected storage node is incorrect, that storage node passes on the communication state information to other storage nodes at random until the associated storage node is identified; that associated storage node can reply directly into the shared network communication, or return the data to the storage node that originally received the request (in some cases directly or via each of the storage nodes along the random path), which can then return the data response request in the communication. In the multicast methodology, a broadcast to all or some of the storage nodes is made by the originally receiving storage node or the network switching device; the associated storage node that responds is assigned the communication or has the communication connection migrated thereto. In a propagated methodology, a technique for identifying the associated storage node is employed that is analogous to address resolution protocols, wherein a query to determine the associated storage node is propagated to other storage nodes, which have some stored information relating to where data may be located based on previously received queries, and, if a queried storage node has information relating to where data is located, it forwards the query to the associated storage node, which replies to the query. If a queried node does not have that information, it propagates the query to another storage node, but retains in memory that information so that future queries can be made more quickly. In some embodiments, the communication data channel information of the data transaction is the query. Upon the associated storage node receiving the query, which may comprise the communication data channel information, it may respond directly into a communication with the client, or it may pass the information back to a previous storage node in the propagation. In other cases, a characteristic-based determination method of identifying or selecting the associate node may be used; in this case, the routing of a communication or data units thereof occurs on the basis of certain measured or stored characteristics of the distributed data storage system; for example, the switch or the storage nodes may be queue-aware of the other storage nodes in the system and send the communication or data units thereof to an associated storage node that is can handle the communication the quickest (as such, the switch, the storage nodes jointly, or both, may provide significantly powerful means of providing load balancing). Any characteristics, or a statistical analysis thereof, can be used to inform how communication or data units thereof are routed in this step of determination. In other cases, a predetermined mapping of where data is or should be stored in the storage nodes may be used to determine which storage node should be associated with the specified data transaction; in some embodiments, the mapping may be located at the network switching device (in some embodiments, in the forwarding table of the forwarding plane), or the mapping may have copies thereof located on each or some of the storage nodes, or the storage nodes may otherwise have access to the mapping on a communicatively coupled computing device. The mapping may be updated during operation so that the pre-determined mapping may be determined during the process of identifying the associated storage node (e.g. in case a storage node holding a primary copy of data related to a data request is fenced off or becomes otherwise unavailable, the pre-determined mapping may be amended to forward data requests relating to that data to storage nodes that hold replicas). In embodiments, any of these methodologies or a combination thereof may be utilized in the step of determining the storage node that is associated with the data related to a data transaction.

In multicast situations, if more than one storage node can be associated with a data transaction, then there are a number of ways in which this is handled. If one storage node holds the primary copy (or indeed if there is no primary copy, but rather that replica which has been most recently or heavily used), that storage node will provide a notification to any other storage nodes, as a broadcast or direct message, which hold a replica of the data causing them to not send a response and, in some cases, if necessary, update their replicas. If the storage node that holds a replica does not receive such notification (or alternatively, has the communication migrated thereto), then that storage node will become the storage node associated with the data transaction for that communication. In cases where primary and replica data sets are not designated, there is in some embodiments a negotiation between the storage nodes to determine which should participate in the communication. As an example, a storage node, once it becomes stateful with respect to the network communication, will provide a data request response and also it will broadcast that it has done so; if another storage node, which holds a replica and therefore could potentially be the storage node associated with the data and participate in the coordinated network communication, will only do so if it does not receive the broadcast response confirmation from the first storage node. Other contention-resolution methodologies may be employed in determining which storage node should be associated and join the coordinated network communication, without departing from the scope of the subject matter disclosed herein. In addition, such contention-resolving methodologies may also be used in connection with random, propagated, characteristic-based, and pre-determined mapping storage node determination methodologies.

In another embodiment, there is provided a distributed storage system for coordinating distributed network communication of data transactions between a data client and a plurality of storage nodes, the system comprising: a network switching device, being a network interface between the plurality of storage nodes and the data client, the network switching device configured to manipulate distributed network communication of data transactions to and from the plurality of storage nodes in a coordinated distributed network communication; the plurality of storage nodes, each of the storage nodes comprising at least one storage resource, a network interface controller that provides for communication with the network switching device and at least one other storage node in the plurality of storage nodes, and a processor, and each storage node being configured to send data request responses in the coordinated distributed network communication upon receipt of at least one of the following: a data request in the distributed network communication and communication data channel information, wherein communication data channel information comprises information relating to one of the following: the state of a distributed network communication, the data request, and a combination thereof.

In one commercial embodiment of a system, the networking switching device is provided or used as computing device, which is accompanied by blocks containing one or more storage nodes. The system can be scaled by adding one or more blocks as capacity or performance is required.

In embodiments, the distributed network communication is a transport-layer communication that is a TCP end-to-end communication carried over the network within IP packets, which in turn form part of Ethernet frames. The stream abstraction of TCP communication is, in embodiments, participated in by those data servers that: (i) hold the information, or (ii) are available or are most appropriate based on the current operational characteristics of those data servers as they relate to the data (such as in the case where there are multiple copies of data across a plurality of data servers for redundancy or safety). The shared participation may be implemented by passing all the necessary information from one data server to another (i.e. passing the communication data channel information, or state information) so that the second data server can respond to a data request within the TCP stream, as if the TCP response came from the same data server. Alternatively, the software and/or data server protocols may respond directly to the network switching device, which manages the TCP separate data stacks from the respective data servers and combines them into a single TCP stack. In other embodiments, both the group of data servers and the network switching device participate in this regard; for example, the data servers share a single TCP data stack and the network switching device performs some managing tasks on the data stack to ensure its integrity and correct sequencing information. In embodiments, the data requests are sent as NFS requests in TCP segments forming a stream of data (in this case, the TCP data stream is the data stack). The TCP segments are packaged into IP packets in accordance with current communication protocols.

Embodiments of the instant disclosure may, in general, include distributed client systems which are directed to facilitating a distributed but coordinated network communication between a client node on the one hand and a plurality of server nodes on the other; in some embodiments the system may also include a network switching device to provide additional functionalities and assistance in coordinating the communication to and from the plurality of server nodes. In many types of network communication, there are provided herein methodologies to permit a process on a first network node to communicate with a process on another network node. In this example, each node is an endpoint in this communication and each endpoint has a mechanism for identifying where the other process is running on the network, as well as certain information about the communication relating to the process. When a network node has identified or is able to identify this information, and is thus able to communicate with and engage with a remote process at the other node, such node may be referred to as stateful with respect to the other network node; each node may also be characterized as stateful with respect to the communication between the nodes. Alternatively, this characterization may be referred to as having state with respect to the other node or the communication, as the case may be. The opposite condition to statefulness is statelessness or as "lacking state." Accordingly, a node "has state" with respect to another node with which it is communicating when it has sufficient state information to cause another node to perform a process, or alternatively if it has sufficient state information to carry out a process because or on behalf of another node. In some cases, a node may be referred to as being stateful with respect to the communication between two nodes, when it has sufficient state information to send and receive information between processes running on the respective nodes. In some embodiments, statefulness is handled entirely at a specific level or layer of network communication, so that higher and lower layers need not handle process to process communication. The information required for acquiring statefulness is the communication data channel information. For example, TCP, which is a transport-layer communication protocol, establishes and endpoint to endpoint connection in which mechanisms in the protocol provide for source and destination, sequence information, and integrity checking. As such, TCP segments, the data unit associated with TCP communication, provides all the state information for nodes communicating with each other and to establish endpoint to endpoint connection, ordered streams of data, flow control, reliable transmission, congestion avoidance, and multiplexing. As such, a TCP communication is a common transport-layer communication used in network communication. It should be noted that some transport-layer communication may be completely stateless with respect to the nodes, however, and in some cases the processes themselves may provide or establish the state information; for example, UDP datagrams, which are the protocol data units and are completely independent from one another, can be used for transport-layer communication for VOIP communication, which requires high speed but less reliability and so the overhead of TCP is not required, and the nodes become stateful with respect to one another only through operation at the application layer. In this example, there is a network communication that is both stateful and connection-oriented, but not above the application layer. In contrast, state information can be carried in some cases by higher than transport layer communication protocols, such as the Internet layer or the link layer.

Although references herein may be made to the Internet Protocol Suite (the TCP/IP model) for illustration, the OSI model of network communication may be referred to as well without departing from the scope and nature of this disclosure. In either case, statefulness and statelessness, as used herein, may refer to whether a network node has sufficient state information to engage in network communication with another network node; state may be established at any layer in either model of network communication.

Some non-limiting examples of processes that require communication from one process on a network node to another process on a another network node, including the following non-limiting examples: return data from a file system, to conduct a remote procedure call, provide access to email, provide remote support services (e.g. SNMP), remote command execution, secure network services, and content and media transfer protocols, distributed naming systems, as well as many others as would be known to a person skilled in the art. In many cases, current network communication protocols provide for a number of different ways of communication.

In some embodiments herein, examples may refer to transport-layer communication between client and server nodes, and in some embodiments, specifically TCP or UDP; it should be understood that unless stated otherwise, an embodiment which is described herein as using TCP or other specific transport-layer protocol for providing statefulness with respect to a node, may be embodied as having a connection-less and stateless transport-layer communication protocol and may also have connection and statefulness associated with a different layer, either higher or lower than the transport layer (i.e., any of application, presentation, session, network, datalink, physical).

In some embodiments, the a transportation-layer communication may be connection-oriented, which indicates that a communication session or a semi-permanent connection is established before any useful data can be transferred; in cases where the connection-oriented communication is also stream-oriented, a stream of data may be received in the same order, or close to the same order as it was sent. In connection-oriented transport-layer communications, there may be provided a transport layer virtual circuit protocol, such as the TCP protocol. The virtual circuit describes end-to-end communication in which a communication session is established between end-points, generally due to the inclusion of sufficient information in each data unit in the data stack that permits the sender and receiver to indicate to one another that a given data unit is part of a data stack and, in some cases, where that data unit belongs in the data stack in a particular sequence. One a virtual circuit is established between two nodes or application processes, a bit stream or byte stream may be delivered between the nodes; a virtual circuit protocol allows higher level protocols to avoid dealing with the division of data into segments, packets, or frames (which may or may not be connection-oriented or provide end-to-end communication). In some cases, a transport-layer communication may be characterized as stateful if it is part of a connection-oriented communication. In some cases, the node or application that constitutes one of the end-points may be characterized as stateful when such end-point is engaged in a connection-oriented communication; when such communication ends, or is migrated to a second end-point, the first end-point becomes stateless (even if, as in this example, the same communication has continued with a different end-point).

In some embodiments, a network communication, such as but not limited to a transport-layer communication, may be connectionless, which indicates that a sending node sends transport-layer data units which are independent of one another. A non-limiting example, for the sake of illustration is UDP. In connectionless transport-layer communication, such as UDP, data units are sent as datagrams; in such datagram-abstracted communication, a datagram serves as a discrete and/or independent data unit for transporting data and which typically lacks the capability to indicate information such as the following illustrative examples: sequence numbers, destination address, source address, checksum or other reliability capability. In some cases in connectionless network communication, such as but not limited to transport-layer communication (e.g. TCP), the sending node does not or is not able to indicate the identity of the receiving node in the transport-layer communication nor is the receiving node capable of determining the identity of the sending node based on the transport-layer communication. In some examples of connectionless network communication, the sending node is not made aware of whether the data unit was received without corruption or loss, or at all, by the receiving node via a connection-oriented network communication. In some cases, there is no indication of sequence available to the receiving node. In such cases, the PDU are connectionless; as such, the data units and the network communication associated therewith may be characterized as stateless.

In some cases, a stateless network communication does not necessarily mean that that higher level network communication is stateless, connectionless or not stream-abstracted: the application-layer information may, for example, be treated by an application or process running on one of the endpoints as a sequential data stream, it may provide for application-layer reordering, reliability checks, and connection-oriented communication, even while the transport-layer communication transporting such application-layer information is stateless, connectionless, and/or datagram-oriented; typically in such cases, however, the application or endpoint must do all the processing work to render the data stream as ordered, reliable, and connected to the application running on the other endpoint.

In embodiments of the instant application, there are provided methods, devices, and systems that provide for participation in a coordinated network communication, said network communication being typically configured for, but not limited to, the communication of data transactions for a distributed data storage system. Application-layer or storage-layer data stacks, such as NFS requests or other RPC calls, are sent and received by clients to storage that is distributed over a plurality of storage resources on one or more storage nodes, the storage nodes in some embodiments being interfaced to network communication through a network switching device.

In some embodiments, a connection-oriented network communication, such as but not limited to a transport-layer communication (as referred to in the following example) for data transactions is disclosed wherein a connection can be created between a data client and one or more storage nodes in the distributed storage system. In some cases, the storage node that is stateful with respect to that communication may, for example, (a) in the case of a read request, not have the data responsive to the read request stored in one of its storage resources; (b) in the case of a write request, may not have the necessary storage capacity or storage characteristics for the data that is to be written; (c) be busy, have a lengthy queue, be experiencing sustained or intermittent inoperability or is otherwise unable to handle the request at all or in manner that meets certain predetermined operational requirements; or (d) not be designated by the distributed storage system as the storage node for handling the request at that time. It should be noted that the previous enumeration include possible examples which may indicate that another storage node can, might or should respond to a data request in whole or in part; this list is not exhaustive as there may be many other reasons or motivations for causing another storage node to participate (or not participate) in a transport-layer communication, all of which may be possible without departing from the scope and spirit of the subject matter disclosed herein. In cases where the transport-layer communication carries a data request (or other application- or storage-layer information) to a first storage node that can, will or should be handled by another storage node, that storage node may, through operation of the storage nodes or through operation of the switch or both, do the following: (i) break or cease the transport-layer connection and, on its own or with contribution by the network switching device, create a new transport-layer connection between the data client and another storage node, wherein the data client is unaware of the change in the storage endpoint (that is, the data client may still think it has just restarted the same transport-layer communication with the same endpoint (or at least the same IP address), but in reality the transport-layer communication has been restarted with a different node); (ii) migrate the transport-layer connection in mid-communication from the first storage node to another storage node (that is, make the second storage node stateful, and the first storage node stateless, with respect to the same transport-layer communication, all without the data client seeing the transition by providing the storage node); or (iii) pass sufficient information to another storage node to allow it to generate data responses that can be placed into the transport-layer communication but without breaking/moving the connection with the first node.

In some embodiments, the breaking and re-starting of the network communication occurs as a way to migrate the communication from storage node to storage node. From the perspective of the data client, this is treated no differently, for example, than a recovery from a server or network problem that caused the communication to cease, and the data client restarts the dropped communication from the beginning. In this embodiment, however, the storage node assesses whether the data request is associated with its storage resources (e.g. for a read request it has the data, and for a write request it has the appropriate capacity and capability, or in either case, the distributed storage system designates another storage node to respond to the data request due to, for example, load balancing, fencing, node distance or proximity reduction, queue awareness, performance improvement, or any other reasons for transferring the communication to another node), and if not, the storage node "breaks" the communication connection.

In some embodiments, the storage node will determine which other storage node should take the communication; in embodiments, the storage node may determine the next node by: querying every other node whether such node has the data or can handle the request, it may send a query or request which gets propagated by the other storage nodes which, if they are not the correct storage node, passes the request forward (in a similar manner, for example, to an ARP resolution), it may assign the next storage node randomly (in which case the process repeats itself if that next node is in fact not a responding node), or it may utilize statistical measurements or other indications of the operational condition of all the other storage nodes and assign the other storage node in accordance with such measurements. An example of the latter, would include the use of a heatmap, for example, to indicate the busiest and/or least busy storage nodes, for a particular type of storage or particular data type. The heatmap may be used in association with, for example, the forwarding table of the network switching device to manage the forwarding of network communication data units.

IP may be referred to as a "packetized abstraction" whereas TCP is a data stream abstraction. In other words, IP is an abstraction that facilitates communication over a network in which data is broken into packets and each packet is handled by the network, and network elements, in order to get the packet from a particular starting point to an ending point. TCP is a stream abstraction wherein a communication stream from one end point to another endpoint where order is important (although TCP does provide for a small level of out-of-order handling) and also to assist in identifying how to treat each segment of TCP information. In general, TCP facilitates the communication between the endpoints over an IP infrastructure wherein the TCP protocol administers the overhead required to pass a data stream between endpoints over a packetized network. The data stream itself may comprise of application level data, such as NFS requests or responses, which may be requested by one endpoint (e.g. the client) and responded to by another endpoint (e.g. the server). An artefact of this is that most network infrastructure, which often utilizes an Ethernet or IP infrastructure, does not have the luxury of accessing into the TCP data stream and making decisions based on this information. Packetized (or framed) network communications use a portion of the information in the header of the packet (or frame) and using a hardware-based fast path switching lookup process (i.e. the forwarding plane) forwards the packet (or frame, or the relevant PDU) to the next element on the way to the correct destination. At the destination, the PDU is received and the TCP transmission is placed in order with the other TCP transmission. One of reasons for this, inter alia, is to pass the packets (or frames or whatever the PDU is associated with the particular layer of network communication) in an extremely fast manner and without having to worry about stream order.

On the other hand, the TCP stream from endpoint to endpoint is a way for a file system (e.g. NFS, as a non-limiting example, and which could also be at the application, presentation or session layers, or indeed another point-to-point abstraction of data communication) to pass information in a packetized data transmission abstraction and let TCP handle the administration of the streaming. An artefact of this is that TCP segments should come more or less in order (some buffering may permit for some low level of out-of-order segments, but even that will generally result in TCP slowing down transmission rates) and also it must come from or be on the way to a pre-determined endpoint. In prior distributed data storage systems (which in this example uses NFS over a transport-layer communication, TCP), this means that a TCP connection must be maintained between a client and a specific NFS storage node, even if the data that relates to the NFS transmission resides on a second NFS storage node. In such cases (which is more likely than not), the first node must pass the request to the second node, which then returns the response to the first node, which then returns, over the TCP connection, the response to the client. This results in a doubling of bandwidth and latency over the first node because it has to send/receive the request and its response twice each.

In respect of the above scenario, the instantly disclosed subject matter coordinates a TCP communication by (a) in some cases, using the network switching device in some embodiments to direct the packet (or frame or whichever is the appropriate network PDU) to the actual storage node where the data is stored, or in some cases it can even analyze and modify the TCP information; (b) having each storage node pass the necessary TCP information (i.e. communication data channel information, or state information) to the correct storage node so that it can respond directly over the TCP connection (or at least, from the perspective of the client, appear to have responded from the correct endpoint).

The contribution of the nodes in some embodiments includes to effectively pass responsibility for the TCP connection directly to the storage node associated with data relating to the data transaction so that the associated storage node can always respond directly to the request. Each node in the distributed data storage system may have software installed thereon that allows each node to locate the associated storage node and pass on or accept the necessary communication data channel information to enable the associated storage node to directly provide a TCP segment that can be placed in the data stream, which can then be packetized and send over the network back to the requesting client. Each storage node may or may not have to have access to current characteristics of every other node, but rather just an ability to send the necessary communication data channel information and have that information get to the associated storage node. In some embodiments, the nodes may have more intelligence regarding the state or contents of all other nodes.

With respect to the network switching device, which may not be in every embodiment, the switch has various levels of contribution. It may have no intelligence and it just sends the packet (or frame or applicable PDU) to the TCP endpoint node, and that endpoint either responds, or sends all necessary communication data channel information to another storage node to respond to the appropriate request directly and thus send a TCP response directly into the data stream. As an ancillary matter, this may lead to out of order TCP segments in IP packets, which may result in some transmission problems since switches on the network or the client itself may think there have been missed or dropped segments—but these can be handled in various ways by the storage nodes and/or the network switch device, including through the use of triangle routing. The switch may recognize where the data resides (i.e. in which node) and can then forward the packets specifically to the node or nodes that have data relevant to the NFS request(s) in such packet. Each node will then respond to the request into the TCP data stream or, if the data is residing on a plurality of nodes, by passing communication data channel information to other nodes that have portions of data so that it can respond into the TCP data stream, in effect, in this example, migrating the connection (although the client and network infrastructure have no visibility to this). In some embodiments, the switch can read all the TCP information, send the request directly to the correct node and then manipulate the response so that it can be placed in the TCP connection data stream (and appear to the network and client as though it was sent from in from a single endpoint).

The following examples are used to illustrate the approaches described in the instant disclosure, although these are not intended to limit the possible arrangements of the instant disclosure in any way. In the following examples, a single client is shown. In many cases, there will be a plurality of clients and embodiments of the instant disclosure support many such different arrangements. Moreover, there may or may not be a switch interposed between the client and the destination node of the distributed data storage system. It is for this reason, the switch may be shown in a dotted in the following examples. While the data storage nodes can be aggregated and presented as a single logical unit, and thus presented as a whole to the client under a single IP address, even though the data and/or communication sessions may be associated with a particular address of the physical node where the client expects the data to reside (e.g. MAC address of Node A). The storage nodes are shown encapsulated in a solid line to indicate their use as a logical whole, and in some cases, a single addressable unit. In cases where embodiments include or require a switch in its arrangement, the switch can be interposed between the client and the available physical storage nodes.

Also in the following examples, NFS requests over a TCP connection will be used to illustrate how the instantly described subject matter may operate. Other application layer (or higher than transport layer) implementations can be used in some embodiments and other transport protocols (or other higher than network layer) can also be used. The use of NFS and TCP are intended to be illustrative only. Other applications may be applicable other than NFS, and the use of embodiments should not be limited to file systems; other application layer utilization is possible. Moreover, other applications may use other communication methodologies to deliver a stream of application-based information from one endpoint to another; for example, UDP, STCP and RPC. Lastly, in some cases all the data that is being requested in a given data transaction from the distributed memory storage system will reside (in the case of a read) or be associated with (in the case of a read or write), at the time the request is received, at a single node. In other cases, the data will be associated with a plurality of storage nodes. These alternative cases are represented in the examples below by showing additional associated storage nodes within a dotted line. Again, there is no limit to the number of additional nodes in the instantly disclosed subject matter, and the plural and scalable nature of the instantly disclosed distributed storage system is intended to be illustrated in this simple case as either a destination node plus an storage node associated with the data related to the data transaction, or a destination node plus two or more such associated and non-associated nodes. The system having only two or three nodes is not intended to limit this disclosure in any way, but rather to show that additional nodes can be added.

In general, the storage nodes of the distributed storage system described herein is configured to enable a distributed implementation of any given TCP stack (i.e. a communication) that allows each of the storage nodes of the system to participate in a coordinated fashion in the same TCP stack. In embodiments, a network switching device that serves in part to interface with and/or distribute data to and/or from the group of nodes that make up the distributed storage system can make the distributed and coordinated participation in the shared TCP stack more effective and efficient. In embodiments that include the switch, the switch can be configured to direct IP packets directly to the storage nodes that hold (or are designated to hold) data associated with a TCP segment (e.g. that carries application-specific data or an NFS request). In other cases, the switch may analyze and store the data of the TCP stream (including payload information and the header) and based on this high level of content-awareness of the TCP stream, forward IP packets more efficiently and amend TCP header information. The latter of which permits TCP segments that come from storage nodes associated with the data transaction, which is different from the connection storage node of that TCP stack, to be placed into the TCP stack in the correct order and with the necessary communication data channel information for the client (and other intermediate network elements) to accept the entire TCP stack.

Different use case scenarios are described below with reference to FIGS. 5 through 9. These are intended to illustrate functionality of the systems and methods described herein and should not be considered to limit this disclosure to the embodiments described below.

Figure 5:
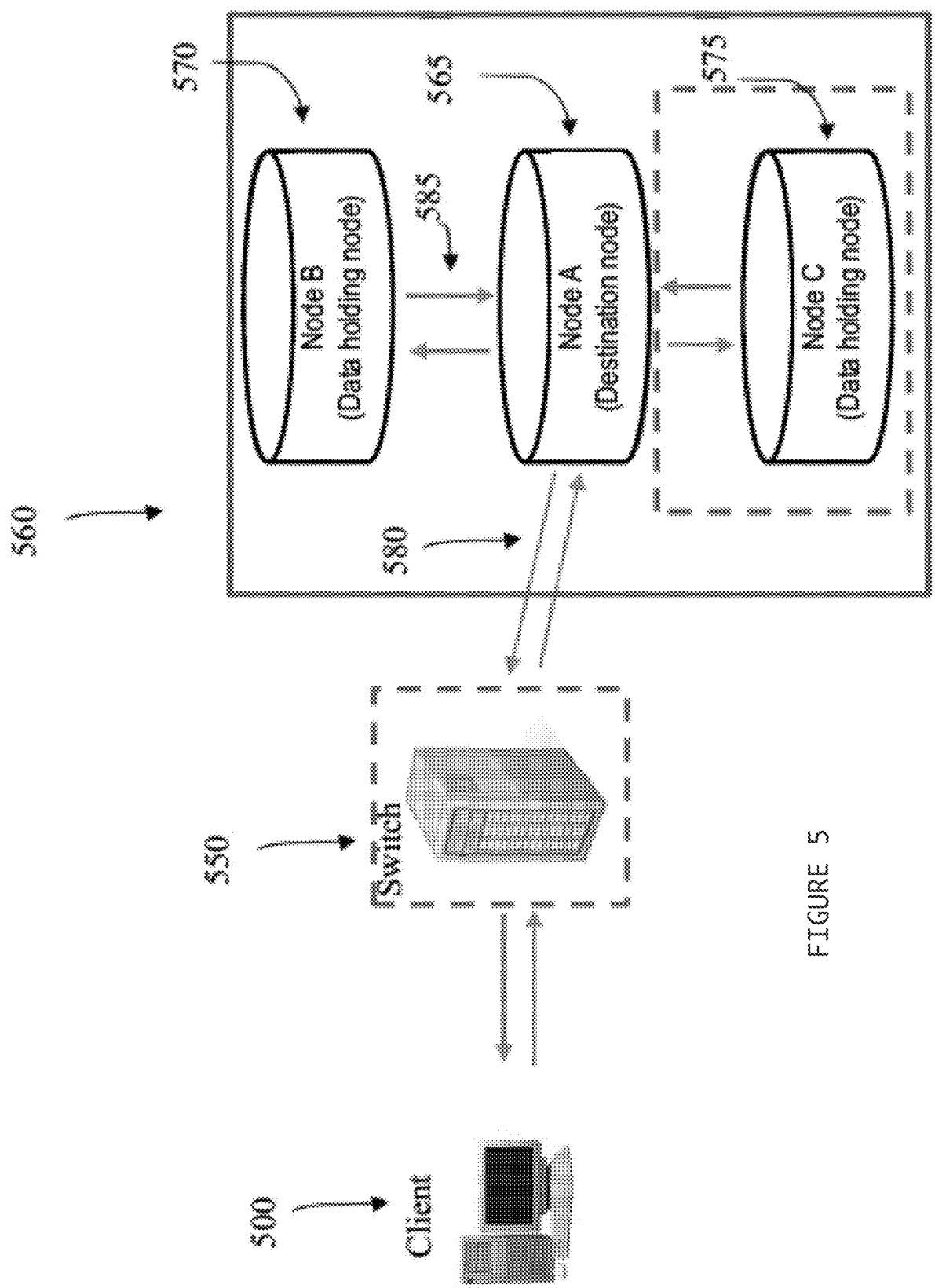
FIG. 5 is a representative diagram of the operation of prior art distributed memory systems.

Turning to FIG. 5, which represents the operation of prior art distributed memory systems 500. In many known distributed storage systems utilizing known file systems, such as NFS, client 500 sends an NFS request for data object X via a TCP connection over IP which is received by node A 565. Upon receiving the request, node A 565 performs a resolution methodology and determines that node B 570 has the main copy of X stored on it (there may be a secondary back up on another node, but the active copy is located on B). A then forwards 585 the NFS read request to node B 570, and B 570 returns 585 X to A 565, A 565 then packages X into a TCP data stream 580 sent over IP to client 500 as a NFS response. Because Node A 570 has had to receive and forward the read request and then receive and forward the response (the data comprising X), bandwidth and latency is effectively doubled over the case where X is located on Node A 565. The complexity obviously grows if not all of X resides on B 570. In some cases, portions of X may reside on B 570 and C 575 (or more nodes not shown), and thus Node A 565 must forward a number of read requests, receive responses and then package and forward the responses.

Figure 6:
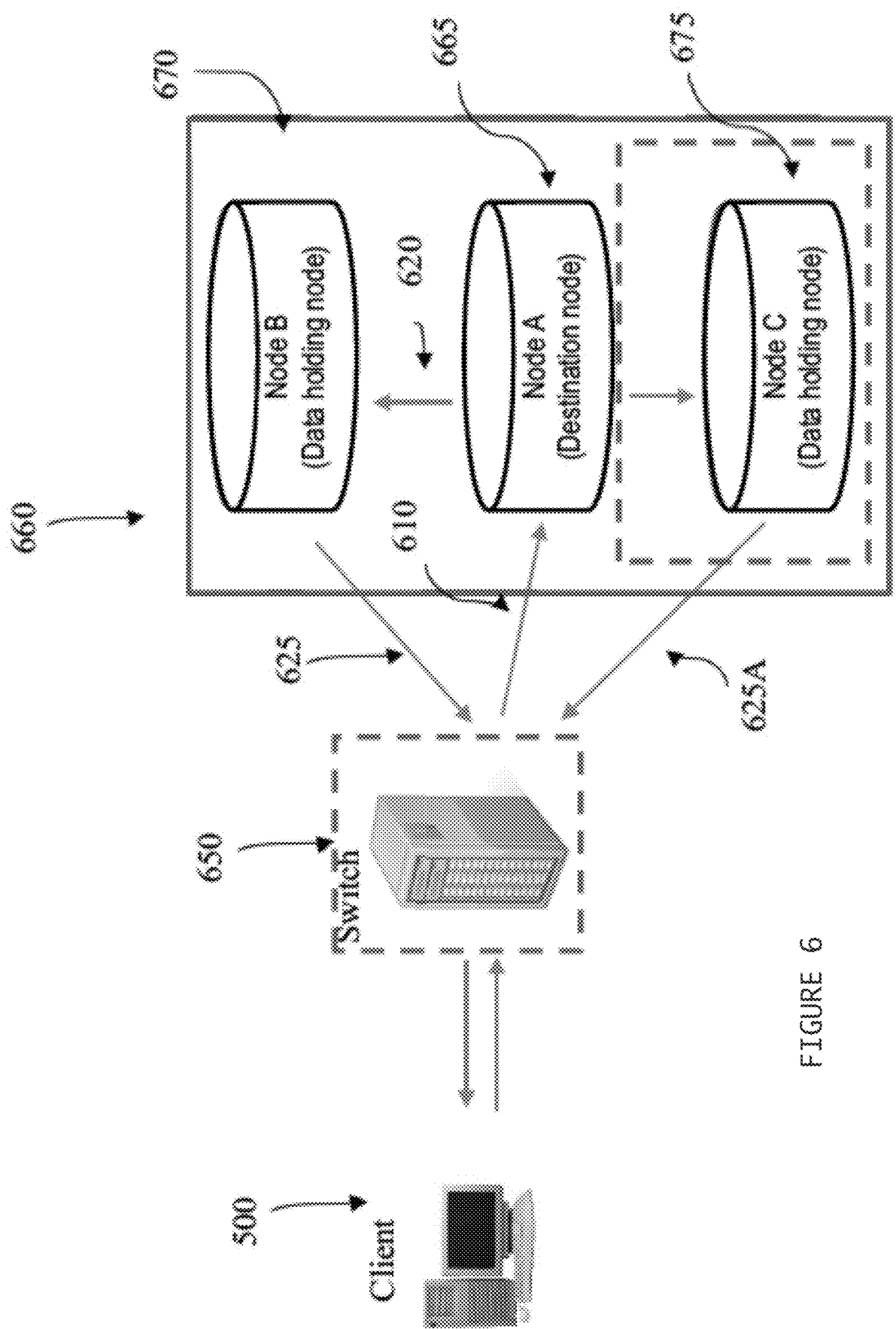
FIG. 6 is a representative diagram of the operation of an embodiment of the distributed memory system of the instantly disclosed subject matter.

With reference to FIG. 6, there is shown one embodiment of a distributed storage system 660 of the instantly disclosed subject matter wherein an NFS write request is sent via a TCP communication stream via IP from the client 500 to Node A 665. The passive network switching device 650 passes on the TCP communication to Node A 665, based on information in the IP and TCP headers in the IP packet. In accordance with operation of the distributed memory system 660, the location for the write data associated with the NFS write request is determined to be on Node B 670 at that time. As such, Node A 665 forwards 620 the NFS write request to Node B 670, which writes the data to storage located in Node B 670. Instead of returning an acknowledgement to Node A 665, who would then package that as a TCP write confirmation to the client, Node B 670 is passed sufficient state information (i.e. communication data channel information) from Node A 665 to package the write confirmation as a TCP communication originating from Node B 670 to the client 500. The TCP connection 625 has, in effect been passed to Node B 670 to directly return the conformation response. Node B 670 packages the information in TCP segments that have the necessary information therein for the client 500, as well as intermediate network infrastructure, including the switch 650, to accept the TCP segment in an IP packet as if it had been sent by Node A 665 (which to the client 500 is the expected communication endpoint). In the case of a NFS read request, Node A 665 would pass the request to Node B 670 who would return the data as one or more TCP segments carrying the requested data as a stream. Again, the information required by Node B 670, in order to fashion TCP segments that would be accepted by the client 500 and/or other network elements, is passed directly from Node A 665 to Node B 670. This effectively changes the TCP connection with endpoints of Client to Node A 665 to a TCP connection with endpoints of Client 500 to Node B 670. There are cases where the data associated with a particular NFS data request can be stored across multiple storage nodes. In such cases, this effective passing of the TCP endpoint connection may occur multiple times during a TCP connection established in respect of a single NFS data request or multiple requests in the same TCP stack. In such a case, the connection can "jump" back and forth between any number of nodes in the distributed data storage system 660; for example, the connection may migrate between Node A 670, Node B 665 and Node C 675. The functionality for enabling this passing of the TCP connection may in some embodiments be a functionality of a software based set of instructions on each of the storage nodes. This software-based set of instructions may permit each node, in various embodiments, to independently or jointly with one or more other storage nodes (a) determine the storage location associated with a data request (e.g. where data currently resides in the case of an NFS read or where data should be written to in the case of an NFS write, such location being located on a data-holding node); (b) provide to the storage node associated with the data relating to the NFS data transaction sufficient information (i.e. communication data channel information), in addition to the NFS data request or information relating thereto, to generate TCP segments that will be accepted as part of a TCP data stream that is returned to the client(s) making the NFS data request, such provision including the placement of the TCP segments in the proper order. Each node need not have functionality to be able to monitor the state, contents and other information of all other nodes (although in some embodiments, this may be the case). In embodiments, the capability to send a request via a communication 610 to Node A 665 and have the data request and/or communication data channel information passed via a communication 620 to Node B 670 and have Node B 670 respond directly via the coordinated TCP connection via communication 625 (or in cases where forwarded to Node C 675, responses via direct communication therefrom 625A) is an example of triangle routing.

There may be cases where this triangle routing as a distributed approach could result in a TCP segment being generated in response to a NFS request and returning that segment out of order with respect to a TCP segment that is or was generated by another storage node in respect of the same NFS request or the same TCP stack (for example because responses from Node B 670 or Node C 675 are returned before responses from Node A 665 are sent, even though Node A 665 is forwarding the data request and state information to Nodes B and C 670, 675). The system has a number of ways of dealing with this issue. First, the storage node that is associated with the data, upon receiving a request to return a TCP segment from another storage node as part of a coordinated TCP stack, may implement a delay in sending the TCP segment to increase the likelihood that the TCP segment that it sends is sent after any TCP segments sent by the node from which it received the request; this delay may be a standard pre-determined value, or it may be a time associated to a value passed along with the TCP information that the storage node that is associated with the data needs to generate a TCP segment capable of being part of the coordinated TCP stack. In other cases, the s node may not send the TCP segment into the coordinated stack until it receives confirmation from the requesting node that a prior TCP segment has been sent. In following examples, using a more active switch, the switch 650 may assist in resolving this problem by, for example, sending such a confirmation.

Figure 7:
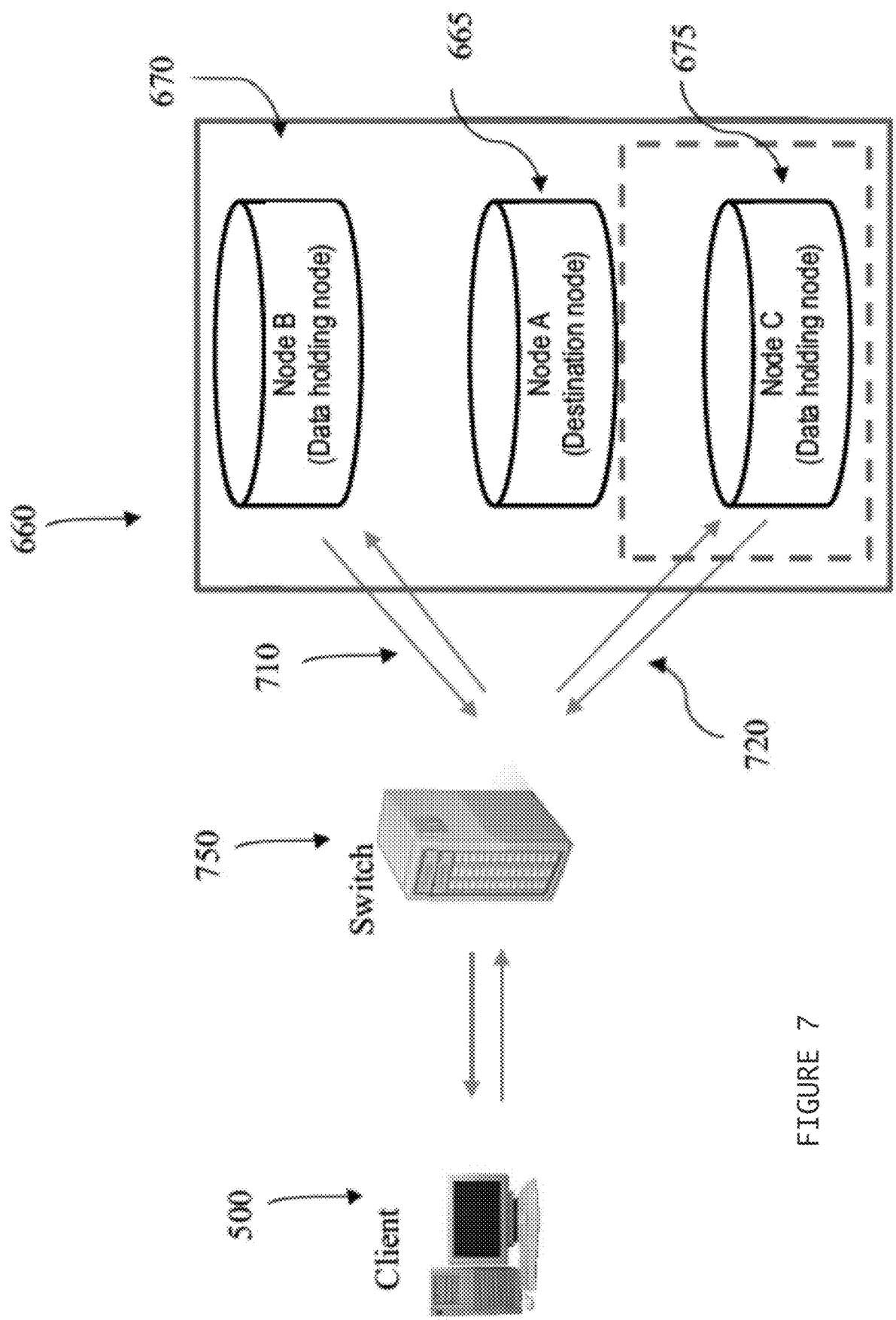
FIG. 7 is a representative diagram of the operation of another embodiment of the distributed memory system of the instantly disclosed subject matter.

With reference to FIG. 7, depicting one embodiment of a distributed storage system 660, the switch 650 is required for the operations described in this example. The switch 650 will be sufficiently content-aware regarding the packets (or frame or other PDU, depending on the layer or communication protocol) that it forwards via network communication 710 or 720 to make decisions about where each packet should be forwarded. The switch 650 is configured to either override the forwarding tables for received IP packets based on certain information available from the content of the packet, which is available in this case from the IP and/or TCP header information and comparing that with information relating to characteristics, states, or contents of each of the connected storage nodes. Using this information, IP packets can then be forwarded directly to the storage node associated with the data of the data request (in this example Nodes B 670 and C 675) instead of the destination node (in this case, Node A 665) of the TCP stack. In cases where the TCP stack has multiple segments within a single packet, the switch 650 may be configured to generate a copy of the packet and forward each of them both to their respectively appropriate location. Responses to the requests would then be handled by each of the receiving data-holding nodes (Nodes B 670 and C 675), each generating TCP segments with the appropriate information to permit the client 500 (and/or other network infrastructure as may be necessary) to handle the TCP segments within or as part of a single coordinated TCP stack, even though the segments of which originate from more than one storage node and in most cases from storage nodes that are different from the expected destination node 665.

Embodiments utilizing similar approaches as that depicted in FIG. 7 and described above, may lead to the risk of TCP segments from the same coordinated TCP stack being sent out of order. In order to mitigate this risk, the switch 650 may assess the order of TCP segments that it recognizes as being part of the same TCP stack and then re-order them into the correct order (to the extent that such segments are in fact out of order). In other cases, the data-holding node may delay sending a response in cases when, for example, the TCP segment that is being handled by the data-handling node is behind other data in the incoming TCP stack within a given IP packet. In other cases, the switch 650 may provide either information that causes the data-holding node to delay sending the TCP segment (the amount of delay being a predetermined amount of time or calculated based on the information sent by the switch). In yet other cases, the data-holding node may be configured to not send the TCP segment until it has been provided confirmation that the TCP segment in question is next in the sequence and should be sent; this confirmation may come from the switch 650 or from another node (the node holding the data that is part of the or a preceding TCP segment in the TCP stack). It should also be noted that out-of-order TCP segments in a TCP stream may be experienced for a variety of reasons, not limited to the coordinated control of a shared TCP stack from a distributed storage system as disclosed herein; the means of mitigating the risk of out of order TCP segments that may occur in the cases identified above, may also be used in such other cases. Furthermore, in cases where the client 500 can handle out of order data streams, for example, because the application-layer can re-order them at the client 500 or order is simply not important, the switch 650 may amend data unit passing therethrough by changing the sequence number to reflect the order of reception; this will ensure that TCP or other such reliable protocols do not cause the communication to slow down.

Figure 4:
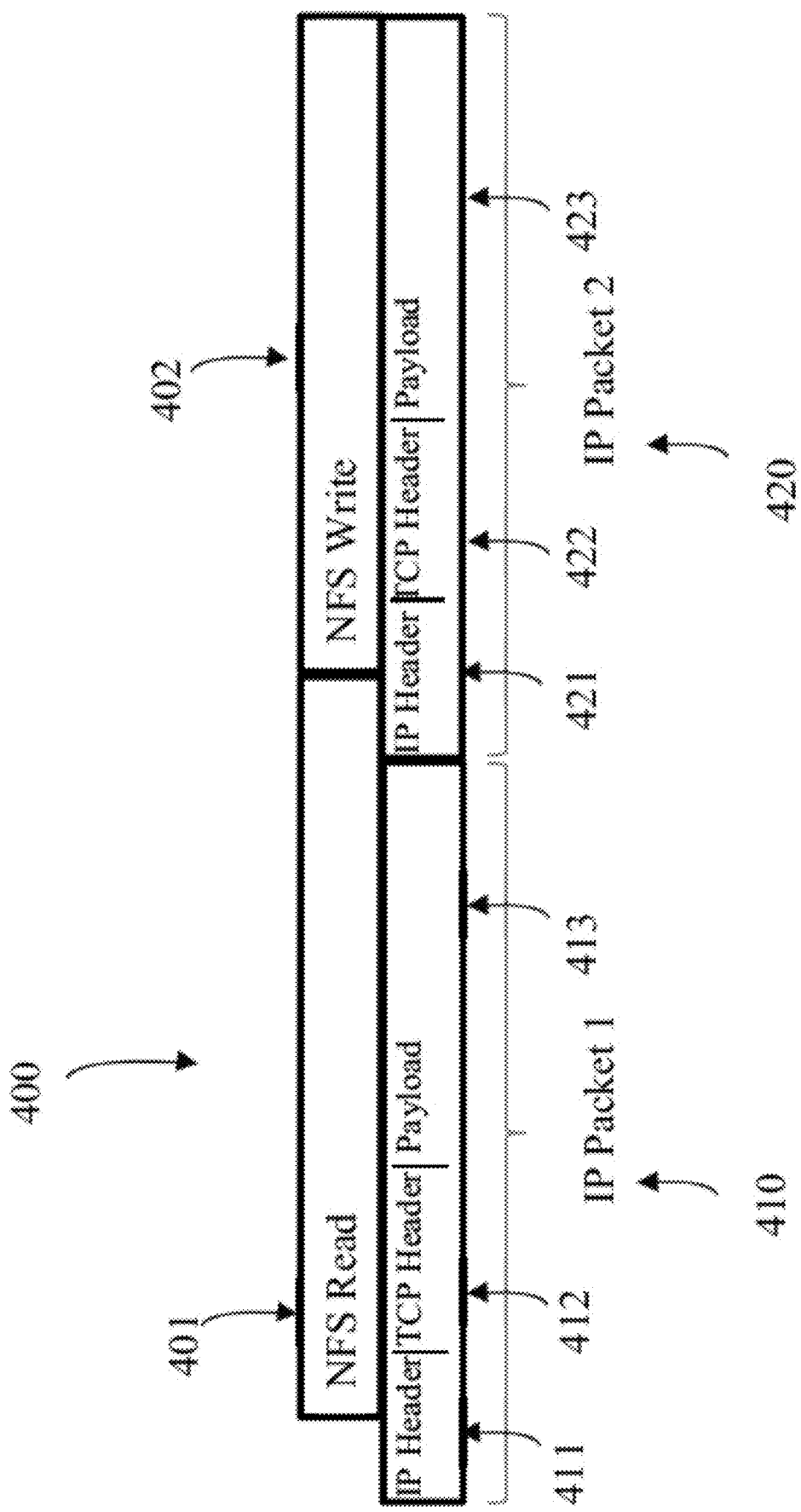
FIG. 4 is a representation of data units used in some embodiments of the instantly disclosed subject matter.

As an illustrative example for the case 3 shown above, the IP packets shown in FIG. 4 are sent over the switch 650 of FIG. 7. As can be seen, IP packet 1 410 is carrying a portion of the NFS Read request 401. IP Packet 2 420 is carrying the ending portion of the NFS read 401 and the middle portion of an NFS Write request 402. The switch can forward IP Packet 1 410 to the data-holding node or nodes for the NFS read request 401; the switch would then forward IP Packet 2 420 to the same or related data-holding node or nodes as a portion of the NFS read 401 is within IP Packet 2 420. A copy of IP Packet 2 420 would also be sent to the data-holding node or nodes associated with the NFS Write request 402. Alternatively, the switch 650 may just forward IP Packet 2 420 to a single data-holding node that is associated with the NFS Read 401, and that node may forward the information relating to the NFS Write 402 to the appropriate node (or vice versa or in any event to any one of the nodes associated with any NFS Request within an IP packet, and let that node handle the distribution of the NFS request and associated communication data channel information, which may include information in the IP header 411, 421 and/or the TCP header, 412, 422 or even the payload information 413, 423, to facilitate the response of each data-holding node as a TCP segment into the coordinated TCP stack).

Figure 8:
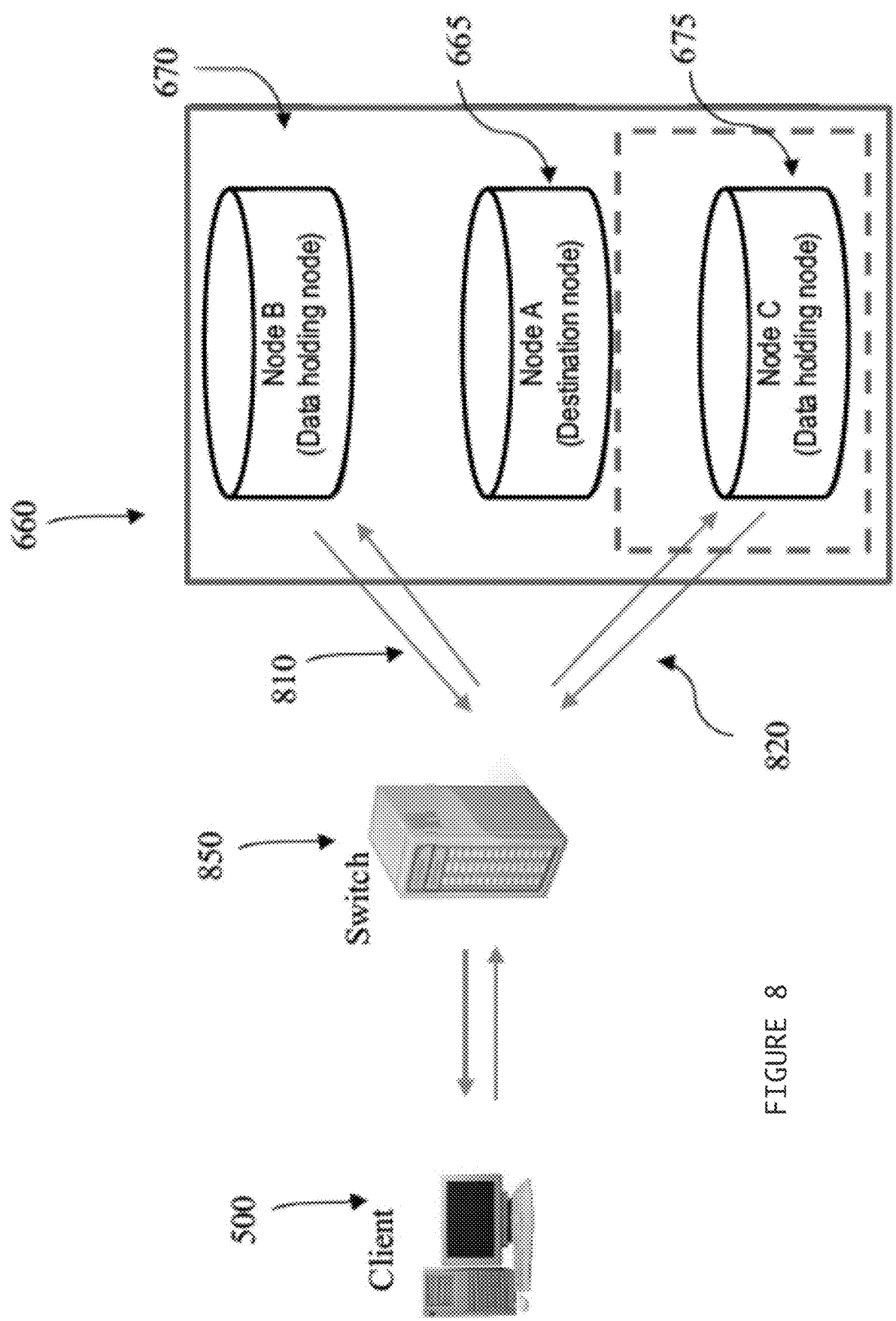
FIG. 8 is a representative diagram of the operation of another embodiment of the distributed memory system of the instantly disclosed subject matter.

With reference to FIG. 8, depicting one embodiment of a distributed storage system 660, the switch 650 can perform a number of functions in the forwarding plane. That is, the switch 650 can read and recognize information from its PDU (i.e. packet or frame) that is the SDU or higher layer information. For example, the switch 650 can read the TCP header but also all or portions of the payload of the TCP or UDP segment within an IP packet. It can fragment NFS requests that are contained within a single packet into multiple packets such that any one packet contains only on NFS request; with reference to FIG. 4, IP Packet 2 420 in this case would be fragmented into a packet containing the NFS write request 402 and the tail end of the NFS read request 401 and, in some embodiments, that tail end and IP Packet 1 410 may be defragmented (subject to any MTU limitations) to form an IP Packet containing all of the NFS read request 401. In that example the defragmented packet and the fragmented packet could be routed separately to the respective associated storage node. The switch 650 can receive TCP segments and then amend the TCP header information in order to put the TCP segment into a coordinated TCP stack; this may occur to permit the TCP segment that originates from a node other than the destination node expected by a given TCP stack into the coordinated stack. In other cases, the TCP information may be read, stored and analyzed to correct out of order TCP segments. The switch 650 may also have capability to amend forwarding tables based on the content of TCP segments, (such as an NFS request) to forward IP packets to the most appropriate storage node based on characteristics of the data associated with the NFS request as it relates to characteristics of the available storage nodes.

Figure 9A:
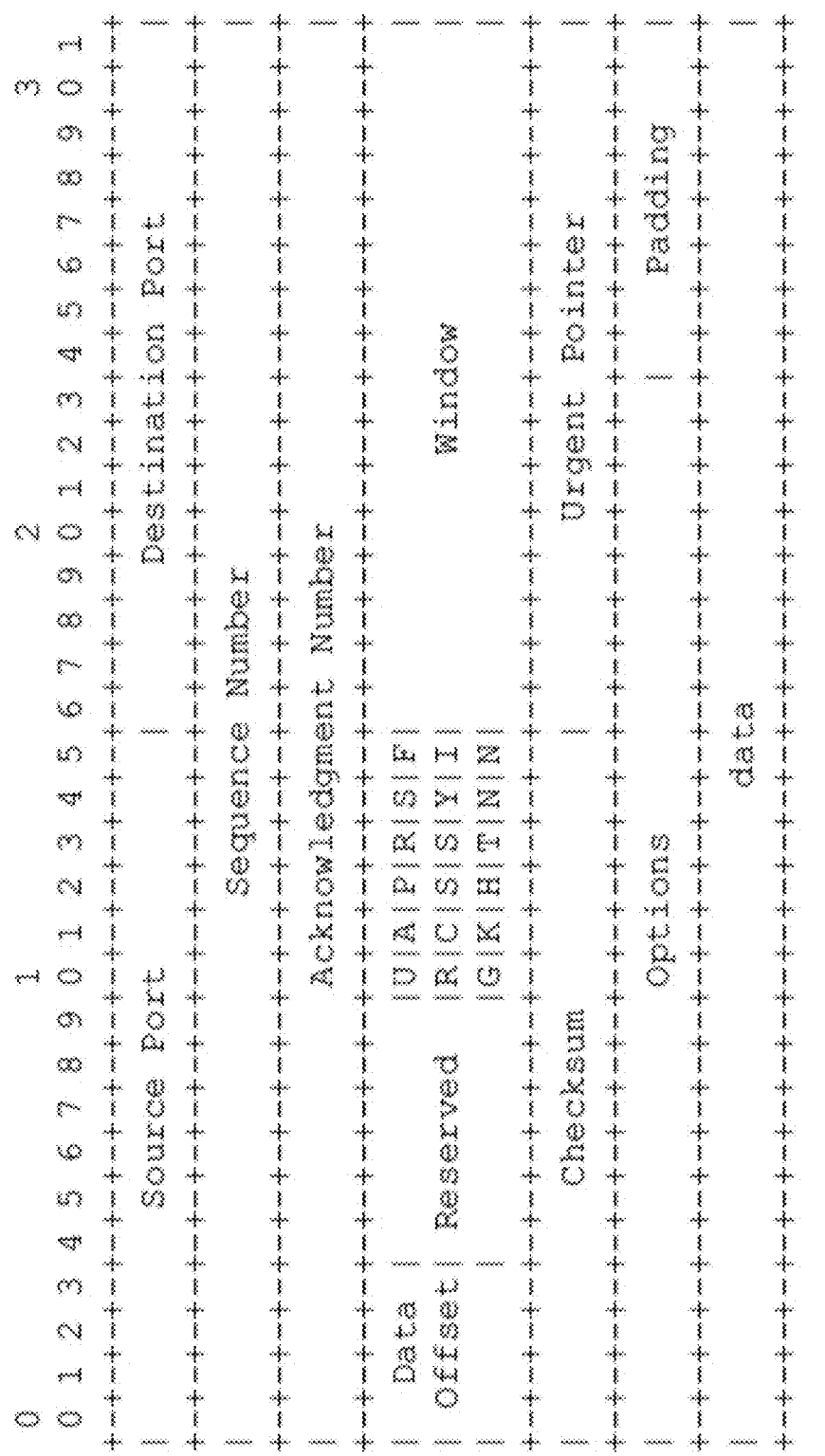
FIG. 9A is a graphical representation of the constituent elements of a TCP segment.
Figure 9B:
FIG. 9B is a graphical representation of the constituent elements of a TCP pseudo-header.

Communication data channel information may relate to, inter alia, any information that is available within a TCP header (such as the exemplary depiction of a TCP segment 900 in FIG. 9A), an IP packet header, or header information from any PDU or SDU. It may also comprise of data in the payload of any such PDU (which may include the SDU); such information may be determined by, for example, packet inspection or deep packet inspection, or indeed by inspection of the payload of any PDU. It may also include information from any TCP pseudo-header 910, as shown in FIG. 9B. Furthermore, it may relate to information regarding the conditions of the network infrastructure, the plurality of storage nodes, or the communication itself.

In some embodiments, the preceding examples of determining the storage node, which will next become stateful with respect to a re-started communication, may, in some embodiments, be done by the network switching device; in such cases, the network switching device determines the correct state information for the next storage node and passes that on and the switch may also update its forwarding tables appropriately. In other cases, both may happen; that is, the network switching device may pass on state information to a particular storage node as the switch has an indication that storage is appropriate, and that storage node, after assessing its appropriateness to conduct the communication, in fact passes sufficient state information (i.e. communication data channel information) to another storage node. The "broken" network communication is then re-started with the other storage node, the other storage node being having sufficient information to become stateful with respect the same communication that was broken and thus appears to the data client as if the same network communication is being conducted.

In some embodiments, the storage nodes and the network switching device may, either alone or in combination, may migrate the network communication from one storage node to another. In exemplary embodiments, the state information (i.e. the communication data channel information) is passed by a first storage node (which is engaging in a network communication), or the network switching device, to another storage node, thereby permitting a connected and stream-oriented network communication of, for example, data transactions, to be seamlessly passed to another storage node. The determination of which storage node will be associated with the data of the data requests, and should thus take over the communication, may be in accordance with the same techniques as described elsewhere herein.

In some embodiments, instead of migrating a connection or statefulness from one storage node entirely to another, a second storage node may be provided sufficient state information so that it can supply a portion of the data units that can then be communicated as part of a coordinated network communication. In other words, data units may originate from a plurality of storage nodes for the same network communication, but each of the storage nodes which do not actually form part of the connection (or virtual circuit) have sufficient state information to send data units which can effectively be placed into the same coordinated communication.

In embodiments, the network switching device may contribute to the coordination of the network communication. In some embodiments, the network switching device determines the storage node that should be stateful or connected in a network communication (or indeed, a higher layer, such as application- or storage-layer). In some embodiments, the network switching device may be operative to manipulate or amend a network communication or data units thereof, including a data stream or individual data units. Such manipulation or control may include the following non-limiting actions for coordinating a transport-layer (or other layer) communication: (i) re-ordering out of order transport-layer data units; (ii) amending the sequence information in a stream of transport-layer data units that are received out of order to reflect a sequence that is the same as the order of reception (this would be for cases in which the sequence may be unimportant or of reduced importance and which would otherwise cause the transport-layer protocol to slow down transmission because it mistakenly believes there is network congestion, but is actually caused because certain data units in the coordinated data stream originated from different storage nodes); (iii) amending transport-layer (or other layer) data units or data streams to ensure that the state information relating to a particular communication is coordinated properly such that the data client receives a consistent communication stack that appears to have come from a single endpoint; (iv) diverts transport-layer communication to a particular node irrespective of the state information in a particular transport-layer (or higher) data unit, which may indicate connection with a different storage node.

A network communication may be stream-abstracted and connection-oriented, but not at the transport-layer; in other words, the transport-layer communication may be datagram-abstracted and/or connectionless, but the storage node and data client, or the application at the storage node and/or data client, or the file system at the storage node may handle the stream-abstraction or connection (or other functionality); the transition from storage node to storage node for a communication may, in some embodiments, occur in accordance with the types of coordination described herein (e.g. breaking the communication, migrating the communication, coordinating multiple storage nodes) for stateless or connectionless transport-layer communication, but in respect of which application layer communication is stateful, connection-oriented, sequential, reliable, etc. In such cases, the state information may not be required for transport-layer communication information, but may require some state information for writing or amending application layer state information. For example, in cases where the transport-layer communication is UDP, but whose datagrams carry RPC message requests (such as an NFS read request), the storage node may provide the necessary state information to the RPC message response so that a change in storage node is seamless or invisible to the data client. As such, the communication data channel information may comprise of information relating to more than one layer of communication to ensure that statefulness can be migrated or communicated to different storage nodes in the distributed storage system.

In accordance with the functionalities permitted by embodiments of systems disclosed herein, including those comprising network switching device and/or a plurality of the storage nodes described herein, there are a number of additional functionalities that can be implemented these include the following examples.

Ordering (and Out of Order Detection):

This may require the use of information that is available at above n or n+1 payload information and may include TCP ordering information. This may include the start and length of a TCP segment in a data stream or series of frames/packets. Since the device is capable of retrieving this information and then storing it, it can determine whether a data unit contains out-of-order segments (either in the payload of a given data unit or over a data stream or series of frames/packets or n or greater PDUs). When an out-of-order SDU is detected, the device can (1) request the applicable memory resource to resend the missing SDU; (2) re-order the sending of the PDU with previous and subsequent PDUs; (3) re-order data within a PDU and/or previous and subsequent PDUs; or (4) amend the sequent information to reflect the actual order of transmission.

Queue-Aware and Queue-Data-Aware Forwarding:

While some existing load balancing systems include some queue-aware forwarding, they are based on very limited information. Most load balancing systems achieve load balancing without feedback from the nodes to which they balancing by, for example, utilizing striping, round robin assignment, or a combination thereof. There are some load balancers that are aware of the queues on available nodes, and whether such nodes are experiencing high queue, and then respond by avoiding sending data to those nodes. In the instant subject matter, the device can assess the data that was sent to those nodes, as well as the data that is being processed at the device, and can then assign data to nodes based on the nature of the data and the nature of the data at the nodes (e.g. not-hot data can still go to a node with a higher than normal queue but hot data should always go to a node with a lower queue). Thus enabling the most efficient node, based both on its queue but also characteristics of its memory and the relevant data, to be used that maximizes performance over the system as a whole. In some embodiments, there is supported the generation of a heat map describing where certain data blocks are situated and direct requests based on the knowledge of "appropriate" storage resources, where appropriateness is assessed against the heatmap. The heatmap, for example, may show latency, queue, capacity, or other characteristics associated with various blocks across the plurality of storage nodes. In other cases, a table that describes where subsets of blocks, and how frequently these blocks are accessed can be generated. The switch will pull information from data units to assess traffic conditions and then build knowledge to create a model of how to direct accesses and then directs requests to the right node.

Fencing:

When nodes in a distributed storage system fail, the failed node may cause problems to live data during the period of failure but also when the period of failure ends and, for example, the failed node begins to respond to out-of-date requests. A common solution is to "fence" the failed node so that all the other elements in the network are aware that the failed node should not be engaged. In known systems, the fenced node is handled by complicated logic that must be stored on and implemented by all the other nodes in the distributed storage system. In the instant subject matter, the device can itself "fence" the failed (or recently failed) node and divert data units that were intended therefor to other nodes and/or ignore response from that node. The other nodes need not maintain or be responsible for the fencing thus saving significant computing resources at the nodes.

Deep-Packet Inspection:

Certain header information has in the past been available by DPI methodologies. Analysis of full payload information, particularly in association with the payloads of other PDUs, has until now been unavailable on OEM network infrastructure. The programmable device provides the ability to extract, store and analyze this information at the forwarding plane. This may include storing and reconstructing data streams in the payloads of contiguous data units.

Forwarding Based on Content (Address):

In some distributed memory systems, portions of a data object may be distributed across a number of physical memory devices. As the memory resources are used, and data associated with the data object is updated, read, written across the distributed memory devices, newer versions of the distribution of the data in that data object will evolve. In such systems, the nodes themselves become responsible for forwarding data requests to the appropriate node when the memory storage associated with data from a data object evolves. In other words, every node needs to be aware of how the most recent version of the data object has been distributed (or at least how that can be resolved). In the instant subject matter, the device can keep track of the memory resource associated with live data in real-time and direct data requests accordingly.

TCP/IP Reframing:

In cases where distributed memory systems utilize a single TCP address for a single logical or virtual unit, which in fact comprises a plurality of distributed physical nodes, data requests that are sent to the distributed nodes may be answered in an arbitrary order based on how busy the nodes are or other factors. The device can reframe the received TCP packets to ensure that they are in the correct sequence as a single data stream back to the client.

Load-Balancing:

The switch and/or the storage nodes can cause a network communication to be migrated to the storage node that has an association with the data related to a data request which is experiencing the lowest load requirements and/or latency. The capability to coordinate a shared network communication, such as a TCP communication, across any of a plurality of storage nodes, results in an ability to migrate the connection to the best storage node that is available to act on the request. For example, In cases where there are multiple replicas, and the primary copy is located on a storage node that is currently experiencing congestion, reduced performance, or a heavy workload, the switch (or indeed the storage nodes themselves) can migrate the connection to a storage node containing a replica that is not experiencing the same issues. The storage node with the replica will, if necessary, update the primary copy and other replicas in the case of a write or update.

Application Framing/Parsing:

Application-layer processes, such as an NFS request or response which are not aligned with a PDU may be reframed or parsed into PDUs that are more closely aligned with the application-layer processes. For example, if a given Ethernet frame, or IP packet, comprises of more than one NFS request or portions thereof, it can be reframed into multiple data units that each comprise only the data from each of the NFS requests or portions thereof. Conversely, if a single NFS request is parsed across multiple data units, those data units can be reframed or reparsed into a single data unit. This reduces the computational requirements of storage nodes since they receive data units that are associated with only a single NFS request, and such requests do not need to be combined with portions from other data units, and then, if necessary passed along to other storage units.

TCP Connection Migration:

Utilizing methodologies described herein, a network communication having a connection with an endpoint, can be migrated across any and all of the storage nodes in the distributed storage system.

Anonymization:

In embodiments, and often depending on how passing the communication data channel is implemented, the client will remains unaware of the node or nodes with which it is participating in a communication data channel, including whether or the communication data channel has been passed to another node. As such, the methodologies and systems described herein may contribute to anonymization techniques. In some embodiments, the nodes of the distributed can remain anonymous or their identities can remain not visible to a client. In embodiments, the communication data channel can be shared amongst multiple clients, instead of the network service nodes, thereby hiding the identity of any one client from the distributed network service system.

Peer-to-peer In embodiments, as the communication data channel information is transitioned between the possible nodes, wherein each node passes the connection with the communication data channel to another node, it may do so for the purpose of facilitating peer-to-peer data interaction. In some embodiments, an end-point of the distributed communication data channel is passed from peer-to-peer; such passing of the channel may be a result of a distributed hash table, wherein each node that is associated with a particular key is found by hashing that key (in effect creating your hash-table segments, wherein each segment is associated with an independent nodes in a network). To the extent that multiple data objects, or event single data objects, are store across multiple nodes in a peer-to-peer network, the communication data channel can be passed directly to the best node for servicing the request for the data object by referencing the distributed hash table. The servicing the request(s) for the data object(s) can be accomplished by multiple nodes without breaking the communication data channel, with little overhead expending in determining the best or appropriate node for continued service.

Exemplary embodiments described herein relate to a distributed data storage system. In embodiments, the communication data channel may facilitate communication between one or more clients and other forms of distributed network services. As such, the systems, methods and devices are not limited to use in respect of a data storage system. As such, there are supported herein distributed network service systems comprising a plurality of network service nodes, the network service nodes being configured for participation in a distributed network communication between a client and at least one of the plurality of network service nodes in the distributed network service. The network service node comprises at least one storage resource configured to store at least a set of instructions for processing data at least one client request. In embodiments which comprise a data storage system, the processing of data may include reading, writing or otherwise associating data storage resources with data relating to the client request, although even for a data storage system, other kinds of data processing may be implemented; other types of processing may be associated with the client request in other types of network service systems (and/or in data storage systems).

In embodiments, the network service node also comprises a network interface for communicatively coupling, over at least one network, a network service node to clients and at least one other network service node in the distributed network service system; and a computer processor module for carrying out the set of instructions that, when carried out by the processor, cause the network service node to process data related to a client request, for example by processing data and then sending a client request response via the distributed network communication to the client, when the client request is associated with the network service node upon receipt of at least one selected from the group comprising of: the client request or communication data channel information from the distributed network communication. The association between the client request and the network service node may be based on the existence of data stored on the at least one storage resource of the network service node that relates to or is responsive to the client request; in other cases, there may be an association if a given network service node is configured to process the client request and generate a client request response; in yet other examples, it may also be capable of determining where such nodes are in the distributed network service. In other words, it is not limited to having data stored or addressable at the network service node. In some embodiments, the network service node may participate in the distributed network communication if (a) the node just receives the client request, in cases where it already has the communication data channel information (e.g. state information) or is capable of generating such information; or (b) the client request and the communication data channel information. In embodiments, the communication data channel information comprises information relating to one or more of the following: a state of the distributed network communication and the client request.

In some embodiments, subject matter described herein may be directed to a node which is part of a distributed network service, including but not limited to storage systems, web servers, databases, proxy services, or other network services known to persons skilled in the art. The nodes can participate in a communication data channel upon the receipt of communication data channel information that comprises of one of: a data request or communication data channel state information. A node can participate in the communication data channel upon the receipt of one of: (a) a client request and communication data channel information (e.g. state information); or (b) a client request only, where the node already has sufficient communication data channel information.

Another embodiment is supported wherein another entity, such as but not limited to the switch, provides or makes available the necessary communication data channel information; as such, the participating network service node may not require the communication data channel information, and would only receive information relating to the client request and the entity would provide the state information to the communication data channel. Such entity may include an administrator, another processor, or a specified/designated node within the plurality of network service nodes.

In some embodiments, the communication data channel disclosed herein can be characterized as an asymmetric communication data channels in that it can maintain statefulness (or alternatively, an active communication channel) between an end-point at one end of the communication data channel while participation at the other end is passed amongst multiple end-points. The communication data channel can be characterized as asymmetric because at each end point the participation at each end can be passed amongst different end-points independently to events (i.e. coordination or sharing of the communication data channel). As such, a single communication data channel may be coordinated amongst the multiple end-points at one end of the channel and a single end-point at the other end; or alternatively, it may be multiple end points at both ends of the communication data channel. In some cases, the communication data channel may appear as, from the perspective of any end-point device (whether client or network service node) that communications with the other end are originating from or destined to a single end-point or as a unicast communication data channel.

While many embodiments described herein comprise a coordinated communication data channel between a single client and a plurality of distributed network service nodes, wherein the single communication data channel is shared amongst such nodes without breaking such channel, the asymmetry may be described in the opposite manner as well. For example, there may be multiple clients sharing amongst them a single channel when communicating with a single network service node. In yet another embodiment, there may be both multiple distributed network service nodes at one end of the channel and multiple distributed client nodes at the other end of the channel; in any cases, participation in a single communication data channel can be maintained as each end point passes statefulness with respect to the communication data channel to other end-points at the same end (i.e. client to client or network service node to network service node).

Embodiments may support any manner of network service system or distributed network service. In general, any plurality of nodes that collectively provide a service to one or more clients over a network using a coordinated communication data channel is supported. For example, such network services could include, but are not limited to, the following distributed services: database servers, file servers, mail servers, print servers, web servers, gaming servers, application servers, or some other kind of server. The data storage or processing activities may be distributed across multiple such servers to provide the service; from the perspective of the one or more clients, the network service appears to be provided by single node, or is otherwise provided across a single stateful communication data channel.

In some embodiments, the distributed and shared network communication channel may provide opportunities for more efficient auditing and security functionalities. In embodiments, an audit record based on information and/or characteristics of client requests and/or client request responses and/or streams thereof can be generated from by the switch as the network communication channel is communicated therethrough. Since the network communication channel is configured to be shared amongst the network service nodes on which the client request is being processed, information that is more closely associated with the specific client request data is available. For example, in a data storage system, the network communication channel is passed directly to the storage node where the data exists, the auditing functionality, which can either be implemented by the switch or by the nodes collectively, can track information that relates to one or more of the following: destination address information associated of the system or the one or more storage nodes, the client, the client request, the data location, or the specific data stored or designated for storage or processing at such a data location. In other network service systems, analogous information relating to the client, the client request, the type and result of processing, and the data resulting from or used by such processing is also available.

As such, the audit information, or audit trail, can result in information that is much "closer" to the data that was previously possible since existing network communication channels have an endpoint at the switch, or possibly in some cases a storage node that may or may not have had the data stored thereon (or otherwise be responsive to a client request). In some embodiments, the switch can embed specific data object identification or addressing information relating to the data directly into a PDU, such as an IPv6 address (see, e.g. U.S. patent application Ser. No. 13/890,850), thus making very specific information relating to the characteristics and location of the data available for the audit record. In other words, the distributed network communication connects end-point to data, as opposed to end-point to end-point. As such, by recording such information made available by using a distributed network communication channel, whose endpoint is the node where the data is stored (and/or otherwise processed), a rich set of additional data that describes client requests and client request streams in new ways becomes available.

For example, providence and frequency of client requests having certain characteristic to specific data and/or processes is available. As such, anomalous client requests for certain data or data processes become much easier to detect from such audit information; such anomalous client requests, which may be anomalous based on the client identity, the data and/or data process related to the client request, the timing of the client requests (or responses thereto), or a combination of these and other characteristics, may be indicative of unauthorized or suspicious activity within the distributed network service system. In embodiments, such audit information may be assessed in real-time, i.e. as it is collected, thus providing immediate, or quasi-immediate indication of unauthorized access to the network service system.

The audit record may also provide information that is "closer" to the data that can be used to measure and assess performance of the system and/or the nodes, collectively and individually. In addition to being able to collect more pertinent information, which can be used for example to assess performance of one or more nodes at specific times, with specific data and/or processes, or a combination thereof, the audit records provide for offloading performance analysis to another time or indeed another system. As such, an analysis of performance can be done by another system without in fact having access to the client requests or the associated data or processes. This is useful for diagnosing and resolving performance issues quickly and remotely, while not drawing resources from the network service system that would better be served carrying out its primary function. In addition, there is no need in such measurement and analysis to provide access to possibly sensitive data to a third-party supplier (e.g. IT services) or sending copies of possibly very large sets relating the client request/response streams to such supplier.

In some embodiments, the switch can be programmed (i.e. loaded with a set of instructions that can be carried out or implemented by a processor on the switch) with an application-level audit function. This may be embodied as an API stored at or made available through a communication interface to the switch. The application-level function can cause the switch to filter certain information relating to the stream of client requests and/or responses (e.g. through audit rules).

In embodiments, the distributed network communication channel provides for isolation and authentication advantages. There are existing virtual data "tunnels" or VLANS that utilize isolation techniques for secure network communication channels; these typically implement end-point to endpoint security that permit an authorized and authenticated client (using an appropriate key, for example) to communicate with a specific end-point, whereas intermediate nodes have "light" access or minimal trust (for example by permitting a network node only enough information to determine how a packet should be treated or forwarded), to a client request/response stream in a network communication channel. This may, for example, for PDUs originating from or destined to a client that has been authenticated and authorized, provide a virtualized private data tunnel or channel over a public network that permits intermediate nodes to forward but not access any data associated with such PDUs (see, e.g., Casado, et al., "SANE: A Protection Architecture for Enterprise Networks," Usenix Security Symposium, 2006.) SANE describes a system wherein network nodes that are between end-points are granted minimal capabilities, and only authorized and authenticated clients can act as tenants to a given network services system through seeking capabilities granted to them by a centralized control system to communicate with an endpoint. In embodiments of the instant invention, the switch may act as such a centralized control system and be configured to grant such access/capabilities, and thus isolation, to authenticated and authorized clients. In contrast to SANE, however, the isolation is from the client end-point to the specific data: some embodiments permit isolation in a distributed network communication channel that is passed amongst network service nodes and in many cases the addressing information of such communication is specifically associated with a specific data object (as opposed to the system or the applicable network service node). As such, by combining the isolation and security features of virtual private data tunnels with the distributed network communication channels as described herein, a higher degree of isolation and security can be achieved by extending such channels from client directly to the data. Referring now to FIG. 1, which illustrates an architecture of one embodiment of the functionalities in a distributed storage system 100 described herein, there is provided an SDN-based data-path protocol integration module 110, which comprises a protocol scaling module 112, an SDN-based data dispatch 116, and an SDN-based data interaction module 114. In embodiments, the data-path protocol integration module 110 is a set of functionalities which are handled by an SDN network switch (not shown). The switch handles data transactions between data clients and storage nodes in the distributed data storage system. In FIG. 1, there is shown in the SDN-based data interaction module representative protocols which may be handled at the switch by performing certain transport-, session-, presentation- and application-layer functionalities in various data personality APIs (based on existing models/applications/protocols or customized proprietary models/applications/protocols), thus permitting a closer integration to the storage system. There is also shown in FIG. 1 an exemplary set of storage nodes 120. Each storage node 120 comprises of a 10 GB network interface 122, a CPU 126, a set of one or more PCIe Flash date resources 128, and a set of spinning disks 129. Each storage node also has stored therein, and implemented by the local CPU 122, a hypervisor 122 that communicates with the operating system on the storage node upon which it resides, as well as the hypervisors and/or operating systems of the other storage nodes, to present virtual machines that present as a logical storage unit to data clients.

The design of the system 100 divides storage functionalities into two broad, and independent areas. At the bottom, storage nodes 120 and the data hypervisor 122 that they host are responsible for bare-metal virtualization of storage media 128, 129 and for allowing hardware to be securely isolated between multiple simultaneous clients. Like a VMM, coordinated services at this level work alongside the virtualized resources to dynamically migrate data in response to the addition or failure of storage nodes 120. They also provide base-layer services such as lightweight remapping facilities that can be used to implement deduplication and snapshots.

Above this base layer, the architecture shown in FIG. 1 allows the inclusion of an extensible set of hosted, scalable, data, personalities that are able to layer additional functionalities above the direct storage interfaces that lie below. These personalities integrate directly with the SDN switch and, in some cases, may be hosted in isolated containers directly on the individual storage nodes 120. This approach allows a development environment in which things like NFS controller logic, which has traditionally been a bottleneck in terms of storage system processing, to transparently scale as a storage system grows. The hosted NFS implementation in the embodiment shown runs on every single storage node 120, but interacts with the switch to present a single external IP address to data clients.

The interface between these two layers again involves the SDN switch. In this situation, the switch provides a private, internal interconnect between personalities and the individual storage nodes. A reusable library of dispatch logic allows new clients to integrate onto this data-path protocol with direct and configurable support for striping, replication, snapshots, and object range remapping.

Dividing the architecture in this manner facilitates increased performance, scalability, and reliability right at the base, while allowing sufficient extensibility as to easily incorporate new interfaces for presenting and interacting with your data over time. The architecture of FIG. 1 presents one or more of an NFS target for VMware, Hadoop-based analytics deployment directly on your stored data, general-purpose, physical NFS workloads, and HTTP-based key/value APIs. Other application-layer functionalities may be implemented at the data-path protocol integration module 110 without departing from the scope and nature of the instant disclosure. In some embodiments, enterprise users may elect to integrate their in-house applications directly against the data personality APIs, allowing their apps to interact directly with the bottom-level storage nodes 120 and reducing protocol, library, and OS overheads.

Figure 2:
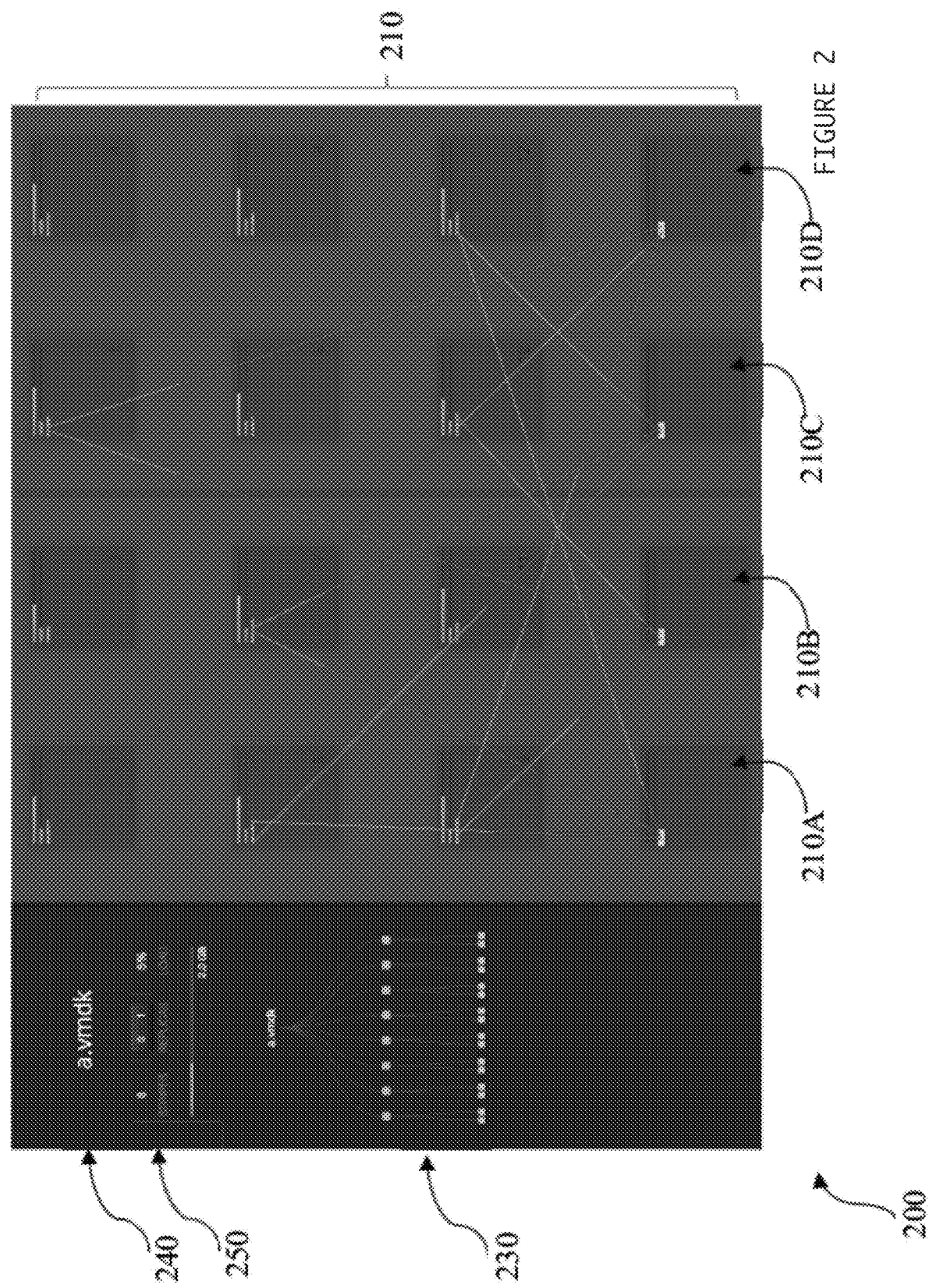
FIG. 2 is a representative diagram of a set of storage nodes in distributed storage system in accordance with one embodiment of the instantly disclosed subject matter.

Referring to FIG. 2, there is provided a representative diagram of a set of storage nodes 210 in distributed storage 200 (the switch, which may in some embodiments implement certain functionalities and serve as an interface between the storage nodes, is not shown). In the embodiment shown, there are 16 storage nodes 220. In this case, a data object, which is the file called a.vmdk 240, is being stored across the distributed storage 200. The status information bar 250 shows that a.vmdk 240 has been "striped" across 8 storage nodes. Data striping is a technique of segmenting logically sequential data, such as a data object or file, so that consecutive segments are stored on different physical storage devices. Striping may be useful when a processing device (e.g. a data client) requests access to data more quickly than a single storage node can provide. By spreading segments across multiple storage nodes, multiple segments can be accessed concurrently, which may provide greater data throughput, which avoids the processing device having to wait for data. Moreover, in this instance, each stripe has been replicated twice, as can be seen from the representative data diagram 230 showing how the storage of a.vmdk 240 has been across the storage nodes. Communications 220 from the storage nodes 210 shows how each of the replicated stripes have been distributed across the system of storage nodes 220. Should any storage node 210 fail or simply become slow or experience reduced performance, a replica stripe for a.vmdk 240 may be used and the storage nodes 210 can rebalance the storage of a.vmdk 240 to continually present optimal storage.

The data hypervisors on the storage nodes work together to manage and maintain objects over time. Background coordination tasks at this layer, which can be implemented by logic located at the switch or on the storage nodes themselves, monitor performance and capacity within the storage environment and dynamically migrate objects in response to environmental changes. In embodiments, a single storage "brick" (which is used in some embodiments to describe the form factor of a commercial product) includes four additional storage nodes. A balanced subset of objects from across the existing storage nodes will be scheduled to migrate, while the system is still serving live requests, onto the new storage nodes. Similarly, in the event of a failure, this same placement logic recognizes that replication constraints have been violated and trigger reconstruction of lost objects. This reconstruction can involve all the storage nodes that currently house replicas, and can create new replicas on any other storage nodes in the system. As a result, recovery time after device failure actually decreases as the system scales out. Similarly, data placement as a result of an indication that priority of a particular data cluster will increase or decrease in upcoming time period can be implemented across the higher (or lower, as the case may be) performing data resources which are available on other storage nodes across the distributed storage 200.

It is important to recognize that the placement of data in the system is explicit. Old approaches to storage, such as RAID and the erasure coding techniques that are common in object storage systems involve an opaque statistical assignment that tries to evenly balance data across multiple devices. This approach is fine if you have large numbers of devices and data that is accessed very uniformly. It is less useful if, as in the case of PCIe flash, you are capable of building a very high-performance system with even a relatively small number of devices or if you have data that has severe hot spots on a subset of very popular data at specific times.

Further referring to FIG. 2 shows a web-based visualization of a running system in which four new storage nodes 210A, 210B, 210C and 210D have just been added. The data hypervisor's placement logic has responded to the arrival of these new storage nodes 210A, 210B, 210C and 210D by forming a rebalancing plan to move some existing objects onto the new nodes. The system then transparently migrates these objects in the background, and immediately presents improved performance and capacity to the system. The system 200 is configured to continually rebalance data clusters, which are deemed, based on the analysis techniques disclosed herein, to be of high priority (or alternatively, have low forward distance), onto those storage nodes that have PCIe Flash resources available. Conversely, data which has increased forward distance with distributed to the spinning disks available across the system 200 of storage nodes 210.

Figure 3:
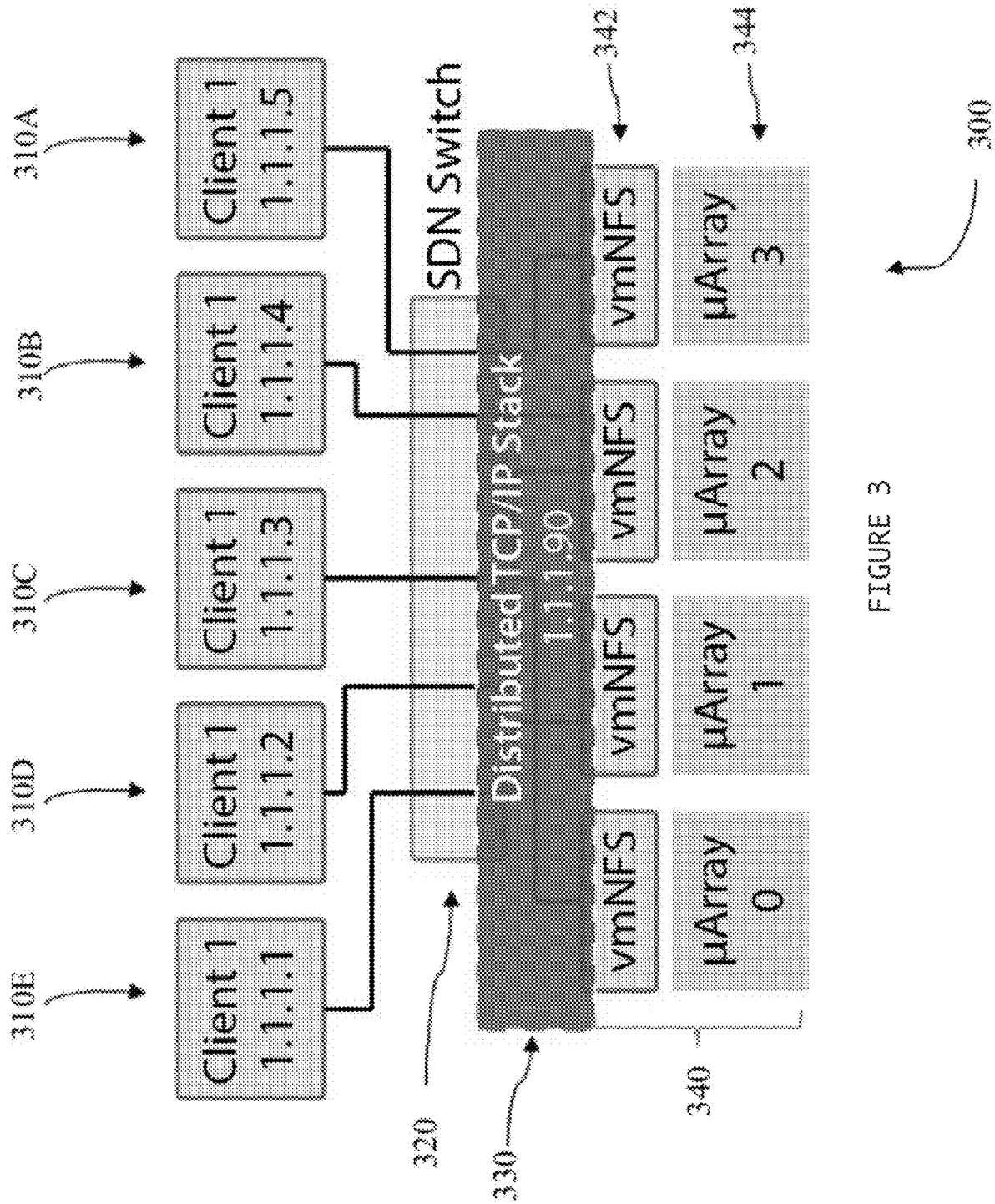
FIG. 3 is a schematic diagram representative of a distributed data storage system in accordance with one embodiment of the instantly disclosed subject matter.

Referring to FIG. 3, there is shown a distributed data storage system 300. Data clients 310A, B, C, D and E are communicatively coupled over a network (not shown) to a network switching device, in this case an SDN switch 320. The SDN switch 320 interfaces the data clients 310 with the storage array 340 and cooperates with one or more of the storage nodes 342 to distribute a single TCP/IP stack 330 and present the storage array 340 as a single IP address to the data clients 310. A virtualized NFS server 342 sits above the physical storage nodes 344. The SDN switch 320 and the vmNFS 342 cooperate to distribute NFS data requests across the storage nodes and also perform data migration to ensure that at any given time, data is stored on the tier of data storage resource that is most appropriate for the forward distance of that data (i.e. low forward distance data is stored on flash; high forward distance is stored on spinning disks).

In one embodiment, a TCP connection is migrated in accordance with the following example in which a single TCP connection is migrated from a first server to a second server in multiple phases. In phase 1, the goal is to quiesce the client connection and drain outstanding requests to the first server. First, the first server calculates the highest sequence numbered byte it can receive from the client (current client ack number+recv window size). First server then notifies the client to not send anymore data by gradually diminishing its receive window to 0. The sum of current client ack number and recv window size remains constant and as the current client ack number increases, the recv window size eventually diminishes to 0 (in this example, it is assumed that a client will still accept data and acknowledge that data (i.e. send ack) when it receives a segment with a receive window of 0). After one RTT, the client should not be sending more data, if it does, the second server will drops those packets. Next, the last byte of the last complete RPC/application request (i.e. NFS request) is the last byte that first server will consume and acknowledge, and all prior segment data should be complete as well (no missing segment). The first server can optionally accept missing data after one RTT (assuming the client will send it) to have more requests to consume. This last client byte is the Client_Sequence_Number.

The first server keeps processing the received requests and replies to the client. Eventually all request will have been processed and all the data will have been acknowledge by the client. This should take one RTT past the time the last request is completed unless replies get lost/dropped along the way. The sequence number of the last byte sent to the client and acknowledge by it is the Server_Sequence_Number. At this point the connection is completely quiesced and the first server should not hold any outstanding state for that client's connection.

In the next phase, phase 2, the connection is migrated to the second server. The state of the connection (i.e. the communication data channel information, in this comprising client ip, client port, server port, server ip, MSS, Client_Sequence_Number, Server_Sequence_Number, congestion window size) is transferred from the first server to the second server. The switch is also notified to update the rules so that the client connection is migrated to the second server.

In the third phase, the connection is restarted on the second server. Once the switch rules have been updated and the connected state migrated, the third phase starts. The first server sends an ack of the last Client_Sequence_Number with a non zero receive window size. Upon reception, the client will then start sending data again. Requests will arrive at the second server, one RTT after phase 3 is started (unless the client doesn't have anything to send).

In some embodiments, a similar example may involve the use of a multicast where during the migration, data is sent to both the first server, and the second server, but only acknowledged/processed by one of them (depending on the sequence number). In this case, the objective is to reduce the downtime to at least 3RTT (One RTT to wait for the last byte sent by the first server to be acked, one RTT before the next request arrives on the second server after migration, and one RTT to drain the outstanding requests).

In some approaches, the client receive window no longer needs to be transmitted as part of the state being migrated, since the new server will not send any data (apart from a ack advertising its own receive window) until the client issues a request (which will contain the client receive window).

While the present disclosure describes various exemplary embodiments, the disclosure is not so limited. To the contrary, the disclosure is intended to cover various modifications and equivalent arrangements included within the general scope of the present disclosure.

What is claimed is:

1. A network service node for use in a distributed network service system comprising a plurality of network service nodes supporting distributed network communications with a client via a network switch, the network service node comprising:
    a storage resource for use by at least one client-accessible service;
    a network interface to the network service system; and
    a processor configured to process a client request when related to said at least one client-accessible service upon both:
        direct receipt of said client request when received by the node via the network switch from the client; and
        indirect receipt of said client request received from another node of the distributed network service system, which received said client request via the network switch, along with related communication channel state information required for the node to become stateful with the client in directly fulfilling said client request with the client.

2. The network service node of claim 1, wherein said processor is further configured to forward said client request along with said related communication channel state information to another node of the distributed network system upon said client request being unrelated to said at least one client-accessible service using said storage resource.

3. The network service node of claim 1, wherein when the node receives said client request from the client via a stateful connection with the client and said client request is unrelated to said at least one client-accessible service using said storage resource, said processor is further configured to forward said client request along with communication channel state information related to said stateful connection to another node of the distributed network system for processing.

4. The network service node of claim 1, wherein the distributed network communications are selected from the following group: physical-layer communications, datalink-layer communications, network-layer communications, transport-layer communications, session-layer communications, presentation-layer communications, and application-layer communications.

5. The network service node of claim 1, wherein the distributed network communications are connection-oriented resulting in a distributed network communication connection between the client and the network service node, and wherein said distributed network communication connection is migrated to another node upon forwarding said communication channel state information thereto.

6. The network service node of claim 5, wherein said distributed network communications are restarted after migration.

7. The network service node of claim 1, wherein the distributed network service system interfaces with the client via a network switching device, and wherein said communication channel state information is received from said network switching device.

8. The network service node of claim 1, wherein, upon said indirect receipt of said client request and said related communication channel state information, said processor is further configured to delay sending a client request response until one of expiry of a predetermined time interval and receipt of a send confirmation from one of the other network service nodes.

9. The network service node of claim 1, wherein the distributed network communications are characterized as one of connection-oriented and connectionless.

10. The network service node of claim 1, wherein the distributed network communications are characterized as one of stream abstracted and datagram abstracted.

11. The network service node of claim 1, wherein the network service node is a storage node, wherein the client-accessible service is data storage, and wherein the distributed network service system is a distributed storage system.

12. A distributed network service system accessible by a client, comprising:
    a network switching device communicatively interfacing the distributed network service system and the client;
    a plurality of network service nodes, each node comprising:
        a storage resource for use by at least one client-accessible service; and
        a processor configured to process a given client request when related to said at least one client-accessible service using said storage resource upon both:
            direct receipt of said given client request when received by said given node from the client via said network switch; and
            indirect receipt of said client request, when directed to another node of the distributed network service system, which received said client request via the network switch, along with related communication channel state information required for said given node to become stateful with the client in directly fulfilling said client request with the client.

13. The distributed network service system of claim 12, wherein:
    said network switching device is configured to identify a destination node identified by said given client request and direct said given client request to said destination node irrespective of whether said given client request is related to said at least one client-accessible service using said storage resource of said destination node; and
    said destination node is configured to reroute said given client request to another node upon identifying that said client request is unrelated to said at least one client-accessible service using said storage resource of said destination node.

14. The distributed network service system of claim 12, wherein said network switching device is configured to:
    direct said given client request to a destination node identified by said given client request upon determining that said client request is related to said at least one client-accessible service using said storage resource of said destination node; and otherwise determine that said given client request is related to said at least one client-accessible service using said storage resource of another node, and reroute said given client request to said other node along with said related communication channel state information.

15. The distributed network service system of claim 12, wherein at least one of said network service nodes is a storage node and the distributed network service system acts a distributed storage system.

16. A network switching device for interfacing between a client and a plurality of network service nodes in a distributed network service system, wherein each of the network nodes comprises a storage resource associated therewith for use by at least one client-accessible service, and a processor configured to process a given client request when related to the at least one client-accessible service using the storage resource, the switching device comprising:

a network interface to receive a given client request from the client and route said given client request to a selected one of network service nodes for processing; and a processor configured to route said given client request via said network interface to a destination node identified by said given client request upon determining that said client request is related to said at least one client-accessible service using said storage resource of said destination node; and otherwise determine that said given client request is related to said at least one client-accessible service using said storage resource of another node, and reroute said given client request to said other node along with related communication channel state information required for said other node to become stateful with the client in directly fulfilling said client request with the client.

17. The network switching device of claim 16, wherein at least one of the network service nodes is a storage node and the distributed network service system acts as a distributed storage system.

18. A computer-readable medium having statements and instructions stored thereon for implementation by a processor on a network switchin device interfacing between a plurality of network service nodes in distributed network service and a client, said processor to route a client request to the network service nodes in fulfilling the client request, wherein each of the network nodes comprises a storage resource associated therewith for use by at least one client-accessible service, and a node processor configured to process a given client request when related to the at least one client-accessible service using the storage resource, the statements and instructions for:

routing the client request to a destination node from amongst the network service nodes that is identified by the client request upon determining that the client request is related to the at least one client-accessible service using the storage resource of said destination node; and otherwise determining that the client request is related to the at least one client-accessible service using the storage resource of another node, and rerouting the client request to said other node along with related communication channel state information required for said other node to become stateful with the client in directly fulfilling the client request with the client.

19. The network service node of claim 1, wherein indirect receipt of said client request comprises receipt of the client request via the network switch and a plurality of other nodes in the distributed network service system.

20. The distributed network service system of claim 12, wherein indirect receipt of said client request comprises receipt of the client request via the network switch and a plurality of other nodes in the distributed network service system.

21. The network switching device of claim 16, wherein indirect receipt of said client request comprises receipt of the client request via the network switch and a plurality of other nodes in the distributed network service system.

* * * * *